US012581512B2

(12) United States Patent
Jiao et al.

(10) Patent No.: US 12,581,512 B2
(45) Date of Patent: Mar. 17, 2026

(54) WIRELESS COMMUNICATION METHOD FOR SYMBOLS TRANSMISSION AND APPARATUS

(71) Applicant: HUAWEI TECHNOLOGIES CO., LTD., Guangdong (CN)

(72) Inventors: Chunxu Jiao, Shanghai (CN); Hongjia Su, Shanghai (CN); Jiayin Zhang, Shanghai (CN); Lei Lu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 338 days.

(21) Appl. No.: 18/337,056

(22) Filed: Jun. 19, 2023

(65) Prior Publication Data

US 2023/0337281 A1 Oct. 19, 2023

Related U.S. Application Data

(63) Continuation of application No. PCT/CN2021/070538, filed on Jan. 6, 2021.

(51) Int. Cl.
*H04W 72/25* (2023.01)
*H04W 16/14* (2009.01)
(Continued)

(52) U.S. Cl.
CPC .......... *H04W 72/25* (2023.01); *H04W 16/14* (2013.01); *H04W 28/06* (2013.01); *H04W 74/0808* (2013.01); *H04L 5/0094* (2013.01)

(58) Field of Classification Search
CPC . H04W 74/0808; H04W 16/14; H04W 72/02; H04W 72/04; H04W 72/12;
(Continued)

(56) References Cited

U.S. PATENT DOCUMENTS

2010/0189188 A1* 7/2010 Li ........................ H04L 27/2647
375/317
2014/0341018 A1* 11/2014 Bhushan ............. H04W 72/541
370/230
(Continued)

FOREIGN PATENT DOCUMENTS

CN 111344969 A 6/2020
CN 111819903 A 10/2020
(Continued)

OTHER PUBLICATIONS

3GPP TR 38.889 V16.0.0 (Dec. 2018), 3rd Generation Partnership Project; Technical Specification Group Radio Access Network; Study on NR-based access to unlicensed spectrum(Release 16), 119 pages.

*Primary Examiner* — Joshua Kading

(57) ABSTRACT

This application provides a wireless communication method and apparatus. The method includes: determining N first symbols in a first slot, where N is a positive real number greater than 1 and less than M, M is a quantity of symbols included in the first slot, M is a positive integer, a frequency domain resource corresponding to the first slot is an unlicensed spectrum, and the first symbols are unoccupied symbols in the first slot; and sending a first signal to a terminal device on the N first symbols. The first signal includes at least one of the following: a symbol copied from a second slot, a to-be-sent first transport block, or a cyclic prefix extension. The second slot is a next slot of the first slot. According to the disclosure, a channel resource in an unlicensed spectrum can be effectively occupied, thereby reducing waste of channel resources.

17 Claims, 14 Drawing Sheets

First slot, including 14 symbols

Second slot, including 14 symbols

There are N symbols remaining in the first slot, where N is a positive real number AGC symbol LBT finishes ⊠ L copied symbols of the second slot ⊟ L symbols copied from the second slot to the first slot

(51) Int. Cl.
  *H04W 28/06*          (2009.01)
  *H04W 74/0808*        (2024.01)
  *H04L 5/00*           (2006.01)

(58) Field of Classification Search
  CPC . H04W 72/1263; H04W 72/20; H04W 72/25;
          H04W 72/40; H04W 28/06; H04W 84/18;
                H04L 5/0005; H04L 5/0083; H04L
                       5/0094; H04L 27/0006
  See application file for complete search history.

(56)                References Cited

U.S. PATENT DOCUMENTS

2015/0180698 A1* 6/2015 Baptiste ............... H04L 27/366
                                                    375/296
2019/0306923 A1   10/2019 Xiong et al.

| | | | | |
|---|---|---|---|---|
| 2019/0394802 | A1* | 12/2019 | Karaki .................. | H04W 16/14 |
| 2021/0092783 | A1* | 3/2021 | Sun .................... | H04W 74/0875 |
| 2021/0194652 | A1* | 6/2021 | Khoryaev ................. | H04L 5/06 |
| 2022/0167402 | A1* | 5/2022 | Liu ........................ | H04W 28/04 |
| 2022/0272670 | A1* | 8/2022 | Ji .......................... | H04W 72/02 |
| 2022/0417963 | A1* | 12/2022 | Wang .................... | H04W 72/23 |
| 2023/0047819 | A1* | 2/2023 | Ding ................... | H04W 72/044 |
| 2023/0146161 | A1* | 5/2023 | Sun ..................... | H04L 27/2607 |
| | | | | 370/329 |
| 2023/0208690 | A1* | 6/2023 | Wu ..................... | H04L 27/2605 |
| | | | | 370/329 |

FOREIGN PATENT DOCUMENTS

| | | | |
|---|---|---|---|
| WO | 2020032706 A1 | 2/2020 | |
| WO | 2020155181 A1 | 8/2020 | |
| WO | 2020198663 A1 | 10/2020 | |

* cited by examiner

The second network device detects, through sensing, that a channel is idle

The third network device detects, through sensing, that a channel is idle

☐ Channel contention period of the network device

▭ ▨ ▨ Data transmission period of the network device

WIRELESS COMMUNICATION METHOD FOR SYMBOLS TRANSMISSION AND APPARATUS

CROSS-REFERENCE TO RELATED APPLICATIONS

This application is a continuation of International Application No. PCT/CN2021/070538, filed on Jan. 6, 2021, the disclosure of which is hereby incorporated by reference in its entirety.

TECHNICAL FIELD

This application relates to the communication field, and more specifically, to a wireless communication method and apparatus.

BACKGROUND

With increasing requirements of mobile communication services for spectrums, data transmission over unlicensed spectrum resources becomes a development trend. As a channel access rule, a listen before talk (Listen Before Talk, LBT) mechanism becomes a mandatory feature of unlicensed frequency bands. To be specific, before accessing a channel and starting to send data, a user equipment (User Equipment, UE) needs to sense whether the channel is idle. If the channel has been idle for a specific time, channel contention needs to be performed before the channel is accessed. If the channel is busy, an operation such as random backoff needs to be performed before the channel is occupied.

Currently, in sidelink (Sidelink, SL) communication on unlicensed frequency bands, channel resources are excessively wasted, resulting in low spectrum resource utilization. Therefore, how to ensure that an SL device effectively occupies channel resources in unlicensed spectrums becomes an urgent problem to be resolved currently.

SUMMARY

This application provides a wireless communication method and apparatus, to allow an SL device to effectively occupy channel resources in unlicensed spectrums, thereby reducing a waste of channel resources.

According to a first aspect, a wireless communication method is provided, including: determining N first symbols in a first slot, where N is a positive real number greater than 1 and less than M, M is a quantity of symbols included in the first slot, M is a positive integer, a frequency domain resource corresponding to the first slot is an unlicensed spectrum, and the first symbols are unoccupied symbols in the first slot; and sending a first signal to a second terminal device on the N first symbols. The first signal includes at least one of the following: a symbol copied from a second slot, a to-be-sent first transport block (TB), or a cyclic prefix extension (CPE). The second slot is a next slot of the first slot.

According to the solution provided in this application, a first terminal device sends the first signal to the second terminal device in an incomplete slot, so that a channel resource in the unlicensed spectrum is effectively occupied, and a possibility of obtaining the channel resource by an SL device is improved, thereby reducing a waste of channel resources, and improving spectrum resource utilization. In addition, decoding performance of the second terminal device is potentially improved, so that SL transmission reliability is improved, and user experience is improved.

With reference to the first aspect, in some implementations of the first aspect, the first terminal device determines, based on a first threshold, whether the first signal includes the to-be-sent first TB, where the first threshold is configured by radio resource control (RRC), preconfigured, or protocol-specified.

For example, when N is less than the first threshold, the first signal does not include the to-be-sent first TB. In other words, a quantity of symbols copied by the first terminal device from the second slot is L, where L is a positive integer less than or equal to N.

It should be understood that the L symbols include one or more symbols other than an automatic gain control (AGC) symbol in the second slot, and the N first symbols include a gap symbol.

With reference to the first aspect, in some implementations of the first aspect, a cyclic prefix (CP) of the AGC symbol in the second slot is extended onto the gap symbol, to ensure that a channel idle time on the gap symbol is 16 μs.

For example, when N is greater than or equal to the first threshold, the first signal includes the to-be-sent first TB. In other words, the first terminal device sends the first TB to the second terminal device on L first symbols in the first slot. L is a quantity of symbols used to send the to-be-sent first TB, and L is a positive integer less than or equal to N.

It should be noted that in some of the foregoing implementations, there may be a one-to-one correspondence between N and L. In this case, comparing N with the first threshold is equivalent to comparing L with a third threshold. Herein, there is a one-to-one correspondence between the third threshold and the first threshold. When a value of only L is given, the second terminal device may determine, based on the third threshold in the one-to-one correspondence with the first threshold, whether to receive the first TB in the first slot.

With reference to the first aspect, in some implementations of the first aspect, a second TB is sent to the second terminal device in the second slot, where the second TB is the same as the first TB.

With reference to the first aspect, in some implementations of the first aspect, the first terminal device determines, based on a second threshold, whether a TB sent in the second slot is the same as the first TB, where the second threshold is configured by radio resource control (RRC), preconfigured, or protocol-specified.

For example, when N is less than the second threshold, a second TB is sent to the second terminal device in the second slot, where the second TB is the same as the first TB.

For example, when N is greater than or equal to the second threshold, a third TB is sent to the second terminal device in the second slot, where the third TB is different from the first TB.

With reference to the first aspect, in some implementations of the first aspect, the first terminal device sends a first AGC sequence on the AGC symbol in the second slot. The first AGC sequence is determined based on a value of L, L is a quantity of symbols copied from the second slot or a quantity of symbols used to send the to-be-sent first transport block TB, and L is a natural number less than or equal to N.

With reference to the first aspect, in some implementations of the first aspect, the sending a first AGC sequence includes: sending one first AGC sequence on each of W interlaced resource blocks, where W is a positive integer.

It should be understood that a quantity of the interlaced resource blocks is the same as a quantity of sent AGC sequences.

Optionally, to occupy an unlicensed spectrum channel in the first slot, after finishing LBT, the first terminal device may send redundant information or an empty data packet on N remaining symbols in the first slot. This ensures channel occupation. The redundant information or the empty data packet belongs to the first signal.

According to a second aspect, a wireless communication method is provided, including: receiving a first signal from a first terminal device in a first slot. The first signal includes at least one of the following: a symbol copied from a second slot, a to-be-received first transport block (TB), or a cyclic prefix extension (CPE). A frequency domain resource corresponding to the first slot is an unlicensed spectrum. The second slot is a next slot of the first slot.

According to the solution provided in this application, a second terminal device receives the first signal sent by the first terminal device, so that a channel resource in the unlicensed spectrum is effectively occupied, and a possibility of obtaining the channel resource by an SL device is improved, thereby reducing a waste of channel resources, and improving spectrum resource utilization. In addition, decoding performance of the second terminal device is potentially improved, so that SL transmission reliability is improved, and user experience is improved.

With reference to the second aspect, in some implementations of the second aspect, the second terminal device determines, based on a first threshold, whether the first signal includes the to-be-received first TB, where the first threshold is configured by radio resource control (RRC), preconfigured, or protocol-specified.

For example, when N is less than the first threshold, the first signal does not include the to-be-received first TB. In other words, the second terminal device receives the symbol copied by the first terminal device.

For example, when N is greater than or equal to the first threshold, the first signal includes the to-be-received first TB. In other words, the second terminal device receives the first TB from the second terminal device on L first symbols in the first slot. L is a quantity of symbols used to send the to-be-sent first TB, and L is a positive integer less than or equal to N.

It should be noted that in the foregoing implementations, there is a one-to-one correspondence between N and L. In this case, comparing N with the second threshold is equivalent to comparing L with a fourth threshold. Herein, there is a one-to-one correspondence between the fourth threshold and the second threshold. When a value of only L is given, the second terminal device may determine, based on the fourth threshold in the one-to-one correspondence with the second threshold, whether the first TB received in the first slot is the same as the TB received in the second slot.

With reference to the second aspect, in some implementations of the second aspect, the second terminal device receives a second TB from the first terminal device in the second slot, where the second TB is the same as the first TB.

With reference to the second aspect, in some implementations of the second aspect, the second terminal device determines, based on a second threshold, whether a TB received in the second slot is the same as the first TB, where the second threshold is configured by radio resource control (RRC), preconfigured, or protocol-specified.

For example, when N is less than the second threshold, the second terminal device receives a second TB from the first terminal device in the second slot, where the second TB is the same as the first TB.

For example, when N is greater than or equal to the second threshold, a third TB is received from the first terminal device in the second slot, where the third TB is different from the first TB.

With reference to the second aspect, in some implementations of the second aspect, the second terminal device receives a first AGC sequence on an AGC symbol in the second slot. The first AGC sequence is determined based on a value of L, L is a quantity of symbols copied from the second slot or a quantity of symbols used to send the to-be-sent first transport block TB, and L is a natural number less than or equal to N.

With reference to the second aspect, in some implementations of the second aspect, the receiving a first AGC sequence further includes: receiving one first AGC sequence on each of W interlaced resource blocks, where W is a positive integer.

It should be understood that a quantity of the interlaced resource blocks is the same as a quantity of sent AGC sequences.

According to a third aspect, a wireless communication apparatus is provided, including: a processing unit, configured to determine N first symbols in a first slot, where N is a positive real number greater than 1 and less than M, M is a quantity of symbols included in the first slot, M is a positive integer, a frequency domain resource corresponding to the first slot is an unlicensed spectrum, and the first symbols are unoccupied symbols in the first slot; and a transceiver unit, configured to send a first signal to a second terminal device on the N first symbols. The first signal includes at least one of the following: a symbol copied from a second slot, a to-be-sent first transport block (TB), or a cyclic prefix extension (CPE). The second slot is a next slot of the first slot.

With reference to the third aspect, in some implementations of the third aspect, the processing unit is further configured to determine, based on a first threshold, whether the first signal includes the to-be-sent first TB, where the first threshold is configured by radio resource control (RRC), preconfigured, or protocol-specified.

For example, when N is less than the first threshold, the first signal does not include the to-be-sent first TB. In other words, a quantity of symbols copied by the transceiver unit from the second slot is L, where L is a positive integer less than or equal to N.

It should be understood that the L symbols include one or more symbols other than an automatic gain control (AGC) symbol in the second slot, and the N first symbols include a gap symbol.

With reference to the third aspect, in some implementations of the third aspect, the processing unit is further configured to extend a cyclic prefix (CP) of the AGC symbol in the second slot onto the gap symbol, to ensure that a channel idle time on the gap symbol is 16 μs.

For example, when N is greater than or equal to the first threshold, the first signal includes the to-be-sent first TB. In other words, the transceiver unit is configured to send the first TB to the second terminal device on the N first symbols in the first slot. L is a quantity of symbols used to send the to-be-sent first TB, and L is a positive integer less than or equal to N.

It should be noted that in some of the foregoing implementations, there may be a one-to-one correspondence between N and L. In this case, comparing N with the first threshold is equivalent to comparing L with a third threshold. Herein, there is a one-to-one correspondence between the third threshold and the first threshold. When a value of only L is given, the second terminal device may determine, based on the third threshold in the one-to-one correspondence with the first threshold, whether to receive the first TB in the first slot.

With reference to the third aspect, in some implementations of the third aspect, the transceiver unit is further configured to send a second TB to the second terminal device in the second slot, where the second TB is the same as the first TB.

With reference to the third aspect, in some implementations of the third aspect, the processing unit is further configured to determine, based on a second threshold, whether a TB sent in the second slot is the same as the first TB, where the second threshold is configured by radio resource control (RRC), preconfigured, or protocol-specified.

For example, when N is less than the second threshold, the transceiver unit is configured to send a second TB to the second terminal device in the second slot, where the second TB is the same as the first TB.

For example, when N is greater than or equal to the second threshold, the transceiver unit is configured to send a third TB to the second terminal device in the second slot, where the third TB is different from the first TB.

With reference to the third aspect, in some implementations of the third aspect, the transceiver unit is further configured to send a first AGC sequence on the AGC symbol in the second slot. The first AGC sequence is determined based on a value of L, L is a quantity of symbols copied from the second slot or a quantity of symbols used to send the to-be-sent first transport block TB, and L is a natural number less than or equal to N.

With reference to the third aspect, in some implementations of the third aspect, the transceiver unit is further configured to send one first AGC sequence on each of W interlaced resource blocks, where W is a positive integer.

It should be understood that a quantity of the interlaced resource blocks is the same as a quantity of sent AGC sequences.

According to a fourth aspect, a wireless communication apparatus is provided, including: a transceiver unit, configured to receive a first signal from a first terminal device in a first slot. The first signal includes at least one of the following: a symbol copied from a second slot, a to-be-received first transport block (TB), or a cyclic prefix extension (CPE), a frequency domain resource corresponding to the first slot is an unlicensed spectrum. The second slot is a next slot of the first slot.

With reference to the fourth aspect, in some implementations of the fourth aspect, the wireless communication apparatus includes: a processing unit, configured to determine, based on a first threshold, whether the first signal includes the to-be-received first TB, where the first threshold is configured by radio resource control (RRC), preconfigured, or protocol-specified.

For example, when N is less than the first threshold, the first signal does not include the to-be-received first TB. In other words, the transceiver unit is configured to receive the symbol copied by the first terminal device.

For example, when N is greater than or equal to the first threshold, the first signal includes the to-be-received first TB. In other words, the transceiver unit is configured to receive the first TB from a second terminal device on N first symbols in the first slot.

With reference to the fourth aspect, in some implementations of the fourth aspect, the transceiver unit is further configured to receive a second TB from the first terminal device in the second slot, where the second TB is the same as the first TB.

With reference to the fourth aspect, in some implementations of the fourth aspect, the processing unit is further configured to determine, based on a second threshold, whether a TB received in the second slot is the same as the first TB, where the second threshold is configured by radio resource control (RRC), preconfigured, or protocol-specified.

For example, when N is less than the second threshold, the transceiver unit is configured to receive a second TB from the first terminal device in the second slot, where the second TB is the same as the first TB.

For example, when N is greater than or equal to the second threshold, the transceiver unit is configured to receive a third TB from the first terminal device in the second slot, where the third TB is different from the first TB. L is a quantity of symbols used to send the to-be-sent first TB, and L is a positive integer less than or equal to N.

It should be noted that in the foregoing implementations, there is a one-to-one correspondence between N and L. In this case, comparing N with the second threshold is equivalent to comparing L with a fourth threshold. Herein, there is a one-to-one correspondence between the fourth threshold and the second threshold. When a value of only L is given, the second terminal device may determine, based on the fourth threshold in the one-to-one correspondence with the second threshold, whether the first TB received in the first slot is the same as the TB received in the second slot.

With reference to the fourth aspect, in some implementations of the fourth aspect, the transceiver unit is further configured to receive a first AGC sequence on an AGC symbol in the second slot. The first AGC sequence is determined based on a value of L, L is a quantity of symbols copied from the second slot or a quantity of symbols used to send the to-be-sent first transport block TB, and L is a natural number less than or equal to N.

With reference to the fourth aspect, in some implementations of the fourth aspect, the transceiver unit is further configured to receive one first AGC sequence on each of W interlaced resource blocks, where W is a positive integer.

It should be understood that a quantity of the interlaced resource blocks is the same as a quantity of sent AGC sequences.

According to a fifth aspect, a terminal device is provided, including a transceiver, a processor, and a memory. The processor is configured to control the transceiver to send and receive a signal. The memory is configured to store a computer program. The processor is configured to invoke the computer program from the memory and run the computer program, so that the terminal device performs the method in any one of the first aspect or the possible implementations of the first aspect or the method in any one of the second aspect or the possible implementations of the second aspect.

Optionally, there are one or more processors, and there are one or more memories.

Optionally, the memory may be integrated with the processor, or the memory and the processor are separately disposed.

Optionally, the terminal device further includes a transmitter (transmitter) and a receiver (receiver).

According to a sixth aspect, a wireless communication apparatus is provided, including units configured to implement the method in any one of the first aspect or the possible implementations of the first aspect, or configured to implement the method in any one of the second aspect or the possible implementations of the second aspect.

In a design, the wireless communication apparatus is a communication chip. The communication chip may include an input circuit or interface for sending information or data, and an output circuit or interface for receiving information or data.

In another design, the wireless communication apparatus is a communication device (for example, a terminal device, a Proxy Call Session Control Function (P-CSCF) device, or a gateway device). The communication chip may include a transmitter configured to send information or data, and a receiver configured to receive information or data.

According to a seventh aspect, a wireless communication system is provided, including: a first terminal device, configured to perform the method in any one of the first aspect or the possible implementations of the first aspect; and a second terminal device, configured to perform the method in any one of the second aspect or the possible implementations of the second aspect.

According to an eighth aspect, a computer-readable storage medium is provided. The computer-readable storage medium stores a computer program or code. When the computer program or code is run on a computer, the computer performs the method in any one of the first aspect or the possible implementations of the first aspect and the method in any one of the second aspect or the possible implementations of the second aspect.

According to a ninth aspect, a chip is provided, including at least one processor. The at least one processor is coupled to a memory. The memory is configured to store a computer program. The processor is configured to invoke the computer program from the memory and run the computer program, so that a communication device in which the chip system is installed performs the method in any one of the first aspect or the possible implementations of the first aspect, or the method in any one of the second aspect or the possible implementations of the second aspect.

The chip may include an input circuit or interface for sending information or data, and an output circuit or interface for receiving information or data.

According to a tenth aspect, a computer program product is provided. The computer program product includes computer program code. When the computer program code is run by a terminal device, the terminal device is enabled to perform the method in any one of the first aspect or the possible implementations of the first aspect and the method in any one of the second aspect or the possible implementations of the second aspect.

According to the solutions in embodiments of this application, channel access is performed in an incomplete slot, so that a channel resource in the unlicensed spectrum is effectively occupied, and a possibility of obtaining the channel resource by an SL device is improved, thereby reducing a waste of channel resources, and improving spectrum utilization. In addition, decoding performance of a receiving UE is potentially improved, so that SL transmission reliability is improved, and user experience is improved.

DESCRIPTION OF EMBODIMENTS

The following describes technical solutions of this application with reference to accompanying drawings.

The technical solutions of embodiments of this application may be applied to various communication systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communication system, a future 5th generation (5th generation, 5G) system, or a new radio (new radio, NR) system.

Figure 1:
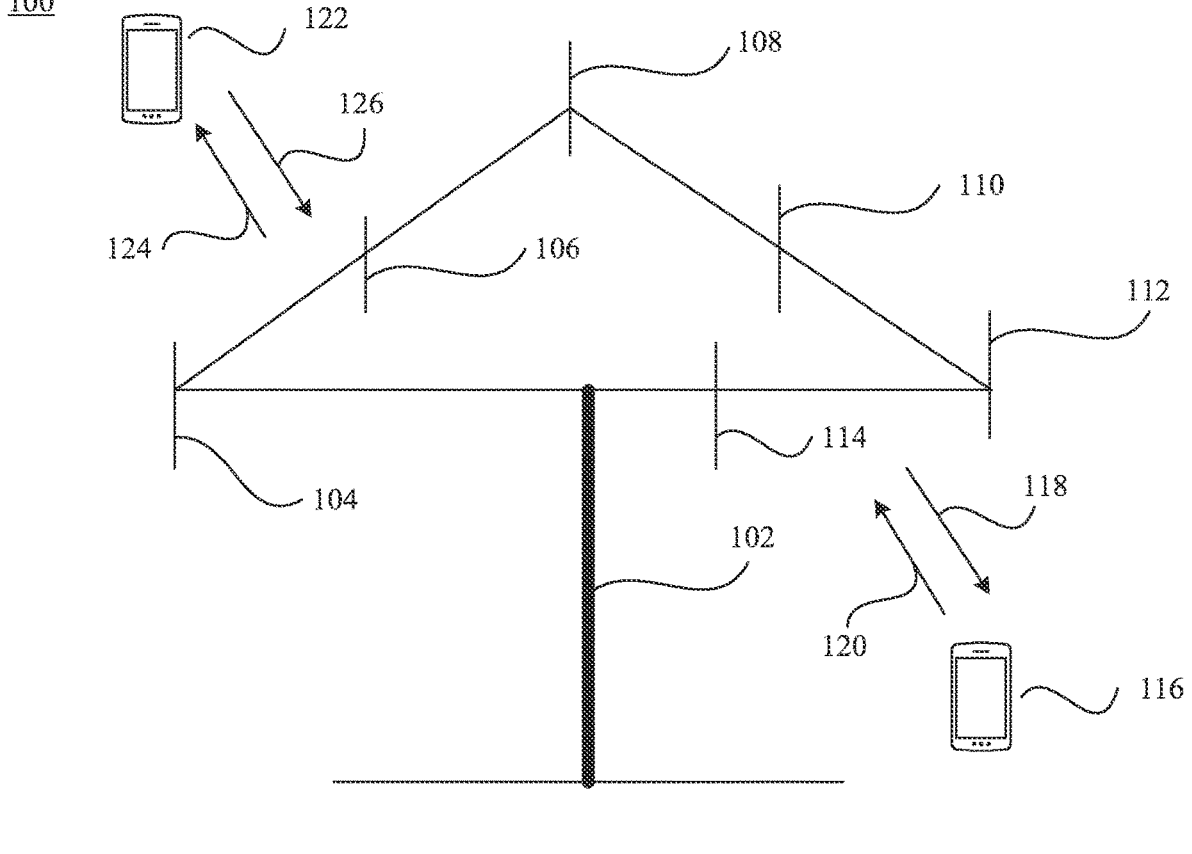
FIG. 1 is a schematic diagram of an example of a communication system applicable to this application.

FIG. 1 is a schematic diagram of a communication system 100 applicable to this application. As shown in FIG. 1, the communication system 100 includes an access network device 102. The access network device 102 may include a plurality of antennas, for example, antennas 104, 106, 108, 110, 112, and 114. In addition, the access network device 102 may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal transmission and reception.

The access network device 102 may communicate with a plurality of terminal devices (for example, a terminal device 116 and a terminal device 122). It may be understood that the access network device 102 may communicate with any quantity of terminal devices similar to the terminal device 116 or 122. As shown in the figure, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antenna 104 and the antenna 106. The antennas 104 and 106 send information to the terminal device 122 over a forward link 124, and receive information from the terminal device 122 over a reverse link 126.

For example, in an FDD system, the forward link 118 may use a frequency band different from that used by the reverse link 120, and the forward link 124 may use a frequency band different from that used by the reverse link 126.

For another example, in a TDD system and a full-duplex (Full Duplex) system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the access network device 102. For example, an antenna group may be designed to communicate with a terminal device in a sector within a coverage area of the access network device 102. In a process in which the access network device 102 communicates with the terminal devices 116 and 122 respectively via the forward links 118 and 124, a transmit antenna of the access network device 102 may improve signal-to-noise ratios of the forward links 118 and 124 through beamforming. In addition, compared with a manner in which an access network device sends signals to all terminal devices of the access network device via a single antenna, when the access network device 102 sends, through beamforming, signals to the terminal devices 116 and 122 that are randomly dispersed in a related coverage area, a mobile device in a neighboring cell experiences less interference.

In a given time, the access network device 102, the terminal device 116, or the terminal device 122 may be a wireless communication sending apparatus and/or a wireless communication receiving apparatus. When sending data, the wireless communication sending apparatus may encode data for transmission. Specifically, the wireless communication sending apparatus may obtain (for example, generate, receive from another communication apparatus, or store in a memory) a specific quantity of data bits that need to be sent to the wireless communication receiving apparatus through a channel. This kind of data bits may be included in a data transport block (or multiple transport blocks), and the transport block may be segmented into multiple code blocks.

In addition, the communication system 100 may be a public land mobile network (Public Land Mobile Network, PLMN), a device-to-device (Device to Device, D2D) communication system, a machine-to-machine (Machine to Machine, M2M) communication system, a vehicle-to-everything (Vehicle to Everything, V2X) communication system, or the like. FIG. 1 is only an example of a simplified schematic diagram, and the network may further include another access network device that is not shown in FIG. 1.

Optionally, in embodiments of this application, the terminal device and the access network device can perform wireless communication (for example, transmit uplink information or transmit downlink information) over unlicensed spectrum resources. The communication system 100 may use a licensed-assisted access (Licensed-Assisted Access, LAA) technology, a dual connectivity (Dual Connectivity, DC) technology, an unlicensed-assisted access (Standalone) technology, or the like.

An unlicensed carrier (an unlicensed spectrum) is a spectrum that can be directly used without license under related regulations of government departments (such as the National Radio Regulatory Commission). In our daily life, unlicensed carriers are used for microwave ovens, remote-controlled toy planes, wireless mouse devices, wireless keyboards, and high-fidelity wireless Internet access (Wireless Fidelity, Wi-Fi), and the like. Resource sharing for unlicensed frequency bands means that for use of particular spectrums, limitations are posed only on indicators such as transmit power and out-of-band leakage, to ensure that a plurality of devices sharing the frequency bands can basically coexist. Operators can implement network capacity offloading using unlicensed frequency band resources, but need to comply with regulatory requirements of different regions and different spectrums on the unlicensed frequency band resources. These requirements are generally formulated to protect common systems such as radar and ensure that multiple systems fairly coexist without imposing adverse impact to each other as far as possible, where the requirements include a transmit power limitation, out-of-band leakage indicators, and indoor and outdoor use limitations, and further some additional coexistence policies and the like in some regions.

Figures 2, 3:
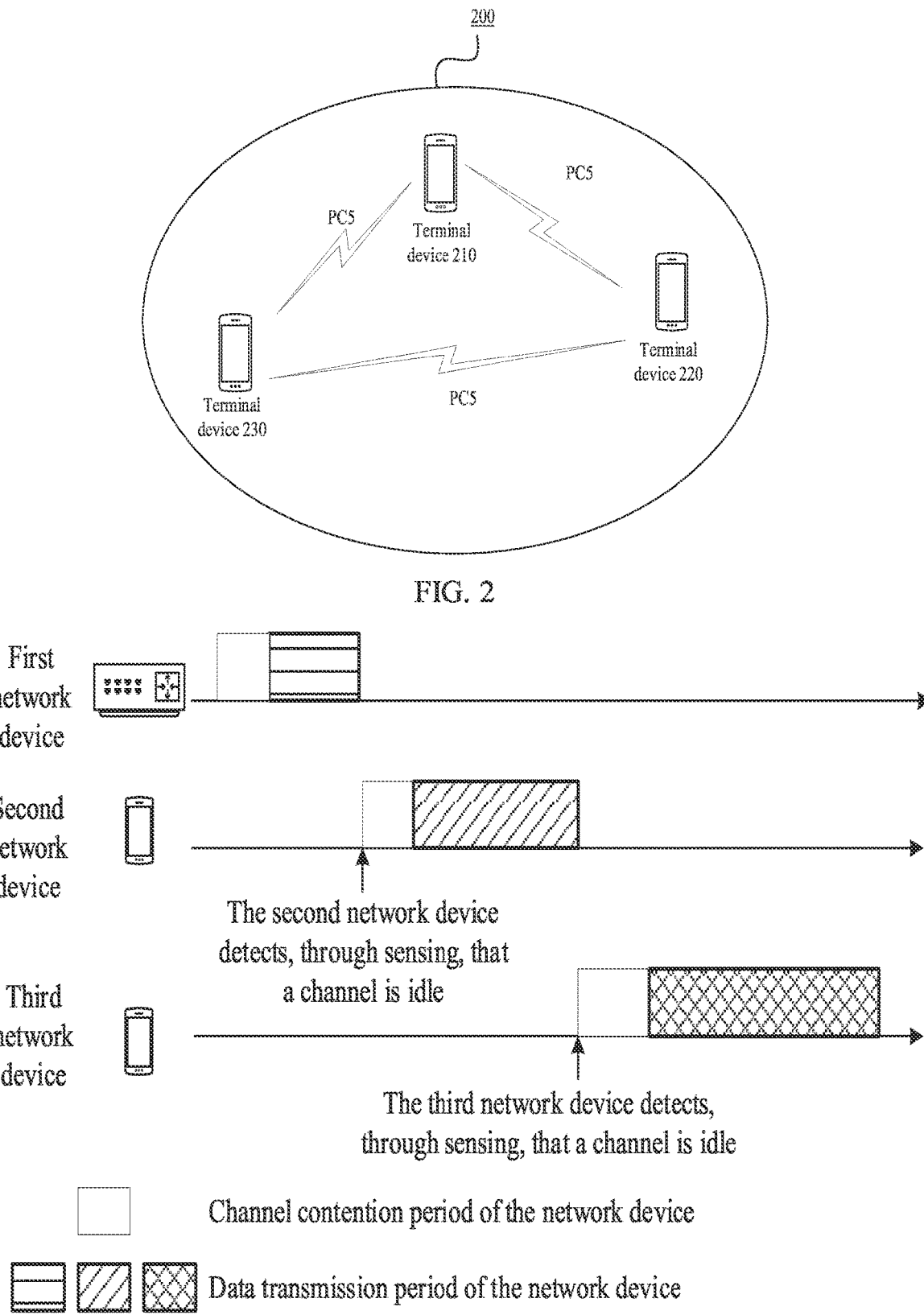
FIG. 2 is a schematic diagram of another example of a communication system applicable to this application.
FIG. 3 is a schematic diagram of an example of a channel access method of a Wi-Fi device.

FIG. 2 is a schematic diagram of an example of a communication system 200 applicable to an embodiment of this application. As shown in FIG. 2, the communication system 100 includes three communication devices: a terminal device 210, a terminal device 220, and a terminal device 230. One terminal device and another terminal device may perform data communication in a D2D or V2X communication mode. A communication link between every two of the terminal device 210, the terminal device 220, and the terminal device 230 is an SL.

It should be noted that two interfaces are defined in V2X: a Uu interface, which is a communication protocol between a terminal device and a network device; and a sidelink SL transmission interface, also referred to as a PC5 interface, that is, a communication protocol between terminal devices.

The sidelink is a communication direct link between one terminal device and another terminal device. A direct link may be understood as a link on which data transmission is directly performed between two terminal devices, and there is no other network nodes between the two terminal devices.

It should be understood that in actual application scenarios, the terminal devices shown in the figure may be terminal devices in various forms and shapes. Details are not shown one by one in the figure in embodiments of this application.

The terminal device in embodiments of this application may be a user equipment UE, an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a station (Station, ST) in a wireless local area network (wireless local area network, WLAN), or may be a smartphone, a portable computer, a global positioning system, a cellular phone, a cordless phone, a Session Initiation Protocol (session initiation protocol, SIP) phone, a wireless local loop (wireless local loop, WLL) station, a personal digital assistant (personal digital assistant, PDA), a handheld device or a computing device having a wireless communication function, or another processing device connected to a wireless modem, an in-vehicle device, an Internet of Vehicles terminal, a computer, a laptop computer, a handheld paging device, a handheld computing device, a wireless satellite device, a wireless modem card, a set-top box (set-top box, STB), customer premises equipment (customer premises equipment, CPE) and/or other devices for paging on a wireless system, and a next generation paging system, for example, a terminal device in a 5G network or a terminal device in a future evolved public land mobile network (PLMN).

As an example instead of a limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user, for example, a head mounted display (Head-Mounted Display, HMD). The wearable device is not merely a hardware device, but is used to implement a powerful function through software support, data interaction, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, in embodiments of this application, the terminal device may alternatively be a terminal device in an Internet of Things (Internet of Things, IoT) system, or may include a relay (Relay) or the like, and another device that can perform data communication with a network device (for example, a base station). This is not limited in embodiments of this application.

In embodiments of this application, the terminal device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more types of computer operating systems that implement service processing using a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by a terminal device or a functional module that is in a terminal device and that can invoke and execute the program.

For ease of understanding the technical solutions of this application, three channel access manners are first briefly described.

Manner 1: Channel Access Method for Wi-Fi Devices

A communication protocol used by Wi-Fi devices is IEEE 802.11, and carrier sense multiple access with collision avoidance (Carrier Sense Multiple Access with Collision Avoidance, CSMA/CA) is mainly used for channel access, which complies with requirements of regulations on an LBT mechanism. To be specific, after detecting, through sensing, that a channel is idle, a network device accesses the channel only after performing channel contention.

From the perspective of a type of a device that performs LBT, Wi-Fi devices may be classified as load-based equipment (Load Based Equipment, LBE), and can perform channel sensing and contention access at any time point without considering a frame boundary. FIG. 3 is a schematic diagram of an LBT behavior of an LBE device. A Wi-Fi device is used as an example. As shown in FIG. 3, a first network device performs channel contention access after detecting, through sensing, that a channel is idle, and occupies the channel for a period of time to send data. After the first network device finishes channel occupation, a second network device may start channel contention access at any moment when detecting, through sensing, that a channel is idle. A behavior of a third network device is similar to that of the second network device. Time taken by different network devices for channel contention may be the same or different. FIG. 3 provides merely an example. This is not limited in this application.

Figures 4, 5:
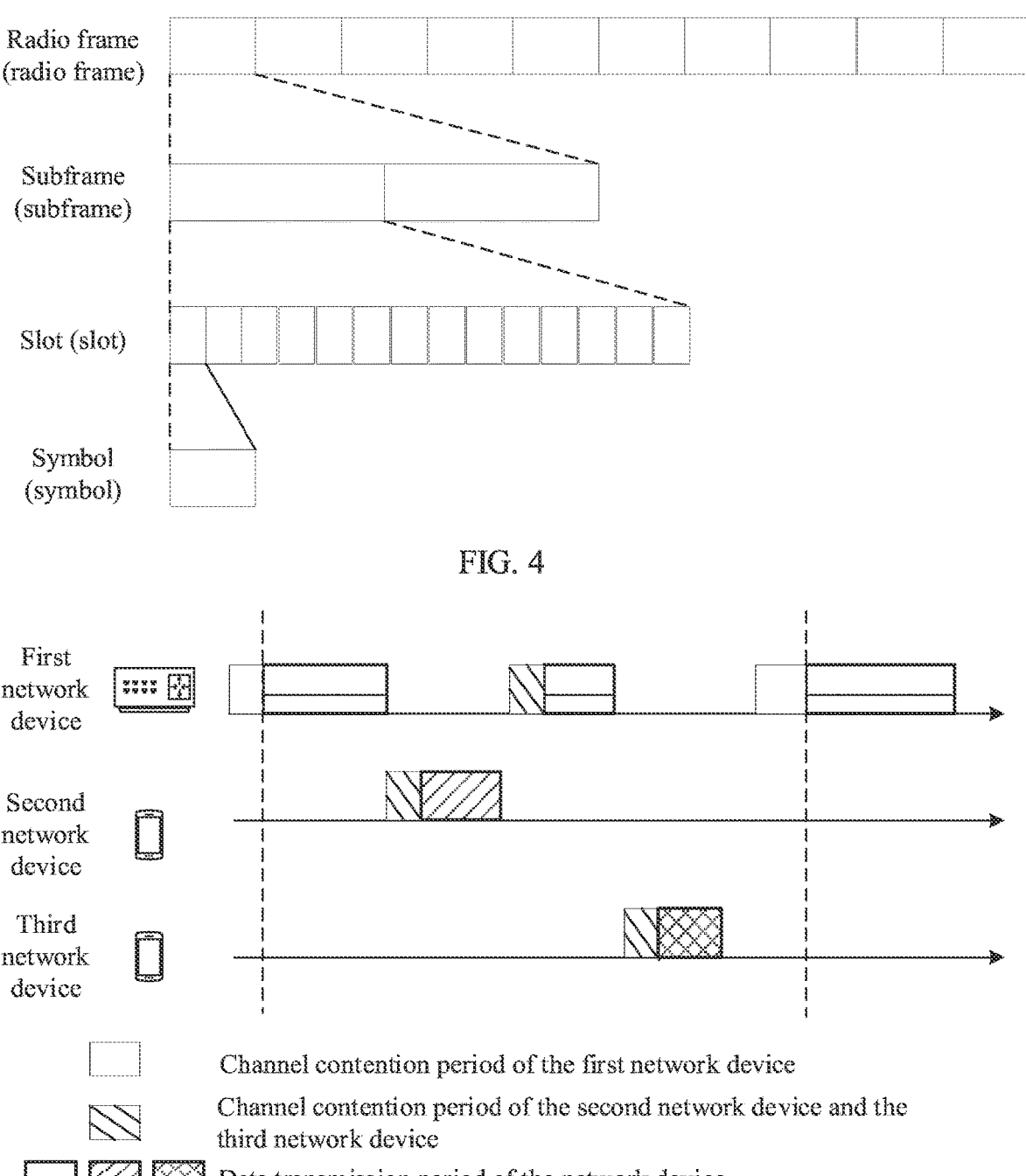
FIG. 4 is a schematic diagram of an example of a hierarchical relationship among a radio frame, a subframe, a slot, and a symbol applicable to this application.
FIG. 5 is a schematic diagram of an example of a channel access method of an NR-U device.

It should be noted that in the field of wireless communication, a frame (frame) is a constituent unit, and is generally presented as a time unit. The 3GPP protocol is used as an example, and duration corresponding to a radio frame (radio frame) is 10 ms. Similarly, there are constituent units such as a subframe (subframe), a slot (slot), and a symbol (symbol). FIG. 4 is a schematic diagram of a hierarchical relationship among a radio frame, a subframe, a slot, and a symbol in the case that a subcarrier spacing used for wireless transmission is 30 kHz. As shown in FIG. 4, one radio frame includes 10 subframes, one subframe includes two slots, and one slot includes 14 symbols. This symbol is also referred to as an orthogonal frequency division multiplexing (Orthogonal Frequency Division Multiplexing, OFDM) symbol, and duration of a symbol is related to subcarrier spacing.

In wireless communication, a transmitting network device and a receiving network device that participate in communication generally need to perform symbol-level synchronization, namely, symbol-level synchronization needs to be performed in a transceiver communication pair. A Wi-Fi system also complies with this principle, but symbol-level synchronization does not need to be performed between different transceiver communication pairs, and further, frame-level synchronization is not required either.

In conclusion, Wi-Fi devices need to perform listen before talk LBT, but a network device does not need to start from a starting time point of a symbol during channel occupation and data transmission.

Manner 2: Channel Access Method for NR-Unlicensed (NR-U) Devices

NR-U devices comply with 3GPP protocols, and uses an LBT mechanism as a channel access method.

From the perspective of a type of a device that performs LBT, NR-U devices can function as LBE. In a possible implementation, timing for performing clear channel detection for NR-U devices is not fixed, and clear channel detection is performed only when there is data to be sent. Before sending data, an NR-U device immediately senses, in a next available initial clear channel assessment (clear channel assessment, CCA) time, whether a channel is idle. If the channel is idle, the NR-U device sends data in a subsequent channel occupancy time; otherwise, the NR-U device does not send data. If it is detected, through sensing in the initial CCA time, that the channel is busy, or that data is not completely sent in the channel occupancy time, the CCA time is extended, and whether the channel is idle is detected within each extended CCA time interval. A length of the extended CCA time interval is the same as that of the initial CCA time. If it is detected that the channel is idle, it is recorded that the channel is idle for one time, and when it is recorded that the channel is idle for N times, data is sent in a subsequent channel occupancy time; otherwise, data is not sent. A value of N is an integer from 1 to q. q is a length of a contention window of an extended CCA time, where q is greater than or equal to 4 and less than or equal to 32. A load-based LBT base station has advantages of good performance and low data transmission delay in the case of heavy load.

NR-U devices can also function as frame-based equipment (Frame Based Equipment, FBE). In this case, NR-U devices are allowed to obtain a channel occupancy time (Channel Occupancy Time, COT) through channel contention access only on a synchronized frame boundary in a system. Herein, a "frame" represents a fixed frame period (Fixed Frame Period, FFP). A specific value of a period is configured using radio resource control (Radio Resource Control, RRC) signaling. Values of periods supported by a current protocol are 1 ms, 2 ms, 2.5 ms, 4 ms, 5 ms, and 10 ms, and each can exactly divide duration of two radio frames, namely, 20 ms.

FIG. 5 is a schematic diagram of an LBT behavior of an FBE device. An NR-U device is used as an example. As shown in FIG. 5, a first network device is a 5G base station (next generation NodeB, gNB), and the first network device obtains a COT through channel contention access only before each FFP, and sends downlink (Downlink, DL) data in the COT. A second network device and a third network device are UEs communicating with the gNB. The second network device and the third network device send uplink (Uplink, UL) data to the gNB through channel contention in a COT obtained by the gNB, instead of obtaining the COT. In a possible implementation, one clear channel detection period includes a CCA time, a channel occupancy time, and an idle time, where the CCA time is the beginning of each clear channel detection period. Before sending data, an NR-U device senses, in the CCA time, whether a channel is idle. If the channel is idle, the NR-U device sends data in the subsequent channel occupancy time, and releases the channel in the idle time of the detection period. If the channel is busy, the NR-U device cannot send data in the subsequent channel occupancy time. The CCA time occupies one or more symbols, and CCA starts from a $1^{st}$ symbol of a subframe. The frame structure-based LBT mechanism has an advantage of simple implementation, and has a disadvantage of large data transmission delay.

In an NR-U system, generally, as many network devices as possible need to meet symbol-level synchronization, to enable efficient cellular communication. Therefore, regardless of whether an NR-U device functions as LBE or FBE, a problem needs to be considered that a finishing time point of LBT may not be a starting time point of a symbol.

Figure 6:
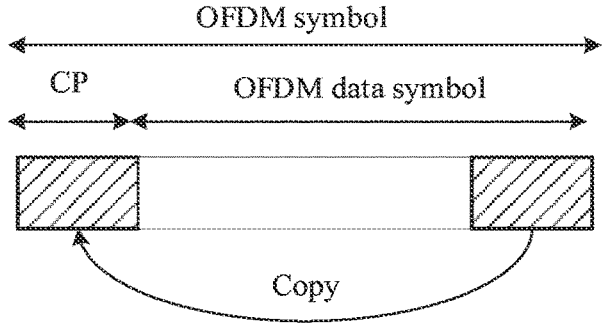
FIG. 6 is a schematic diagram of an example of a process of copying a cyclic prefix (CP) of an OFDM symbol applicable to this application.
Figure 7:
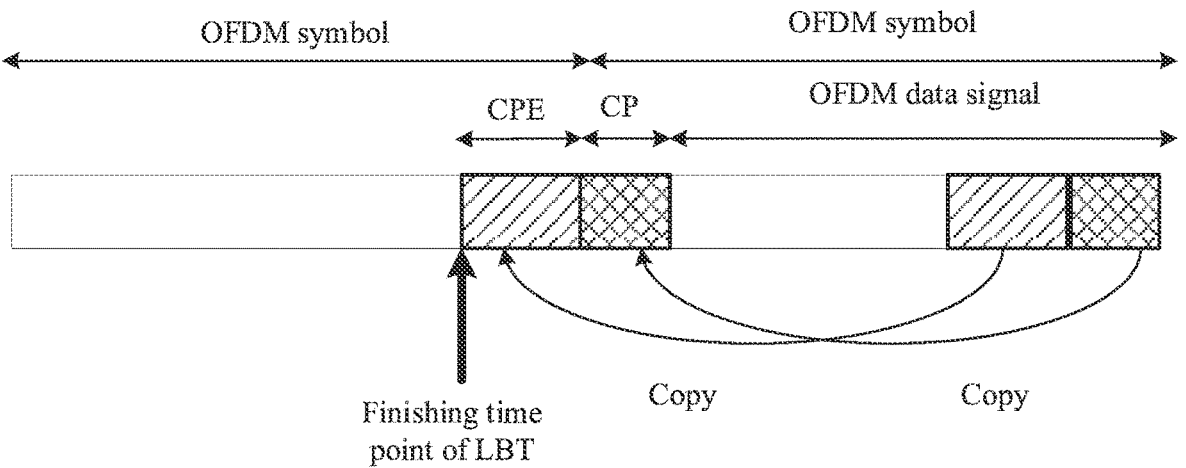
FIG. 7 is a schematic diagram of an example of a cyclic prefix extension CPE process in an NR-U system.

To address the foregoing problem, a main solution is based on a cyclic prefix extension (Cyclic Prefix Extension, CPE) technology. To be specific, a cyclic prefix in a front part of an OFDM symbol is further extended onto a previous symbol until the finishing time point of LBT. FIG. 6 shows a process of copying a cyclic prefix (Cyclic Prefix, CP) of an OFDM symbol. As shown in FIG. 6, a rear segment of an OFDM data signal is copied as a CP and is added to a front part of the OFDM data signal, and the CP and the OFDM data signal constitute the OFDM symbol. FIG. 7 shows a cyclic prefix extension CPE process in an NR-U system. As shown in FIG. 7, because a finishing time point of LBT of an NR-U device is not a starting point of an OFDM symbol, the NR-U device cannot send a complete OFDM symbol. However, according to an LBT mechanism, the NR-U device needs to immediately access a channel. Therefore, a part of a next OFDM symbol is further used as an extended CP and is filled onto the current incomplete symbol, so as to access and occupy the channel.

It should be understood that, the NR-U system can ensure symbol-level synchronization based on cyclic prefix extension CPE.

In conclusion, the NR-U device needs to perform listen before talk LBT. A network device does not need to start from a starting time point of a symbol when occupying a channel, but needs to start from a starting time point of a symbol when transmitting data. Therefore, CPE is required.

Manner 3: Channel Access Method for NR Sidelink (NR SL) UE

Because a frequency band used by a UE in an NR SL communication system does not completely belong to an unlicensed frequency band, channel access does not need to be performed based on an LBT mechanism.

In addition, to implement PC5 interface communication between distributed UEs, the 3GPP NR SL protocol requires that the UEs need to perform symbol-level synchronization, and further requires frame-level synchronization. The synchronization process is implemented by sending and/or receiving a sidelink synchronization signal block (Sidelink Synchronization Signal Block, S-SSB) between the UEs. On this basis, all UEs start SL transmission from a starting time point of a symbol.

In conclusion, an NR SL device does not need to perform listen before talk LBT, and UEs in a local domain need to perform synchronization. Then, a UE naturally starts data transmission from a starting time point of a symbol.

As Manner 1 focuses on an asynchronous transmission system, and there is no technical problem caused by symbol boundary asynchronization or frame boundary asynchronization, the technical solution in Manner 1 is not applicable to an SL system operating in an unlicensed spectrum. It should be noted that in embodiments of this application, "an SL system operating in an unlicensed spectrum" is described as an "SL-U system", namely, an SL-Unlicensed system, and "a terminal device operating in the SL-U system" is described as an "SL-U device". In Manner 2, symbol-level synchronization in the NR-U system is implemented through CPE. However, the SL-U system lacks a mini-slot (mini-slot) structure in the NR-U system. If channel access in the SL-U system is implemented by using only the CPE technical solution in Manner 2, resource utilization efficiency of the unlicensed spectrum is reduced, and channel resources are excessively wasted. On the contrary, if channel access and data transmission are performed by using a mini-slot in the SL-U system, obvious automatic gain control (Automatic Gain Control, AGC) overheads are inevitably caused, resource utilization efficiency is reduced, and channel resources of the unlicensed spectrum are also excessively wasted. In Manner 3, as the LBT mechanism does not need to be considered in the NR SL system, the technical solution in Manner 3 is not applicable to the SL-U system.

Therefore, in view of the foregoing problems, to improve efficiency of using D2D over unlicensed frequency bands, and improve user experience and SL transmission reliability, this application provides an unlicensed spectrum channel access method for an SL-U device, to allow channel access to be performed in an incomplete slot, effectively occupy channel resources in unlicensed spectrums, and improve spectrum resource utilization.

Figure 8:
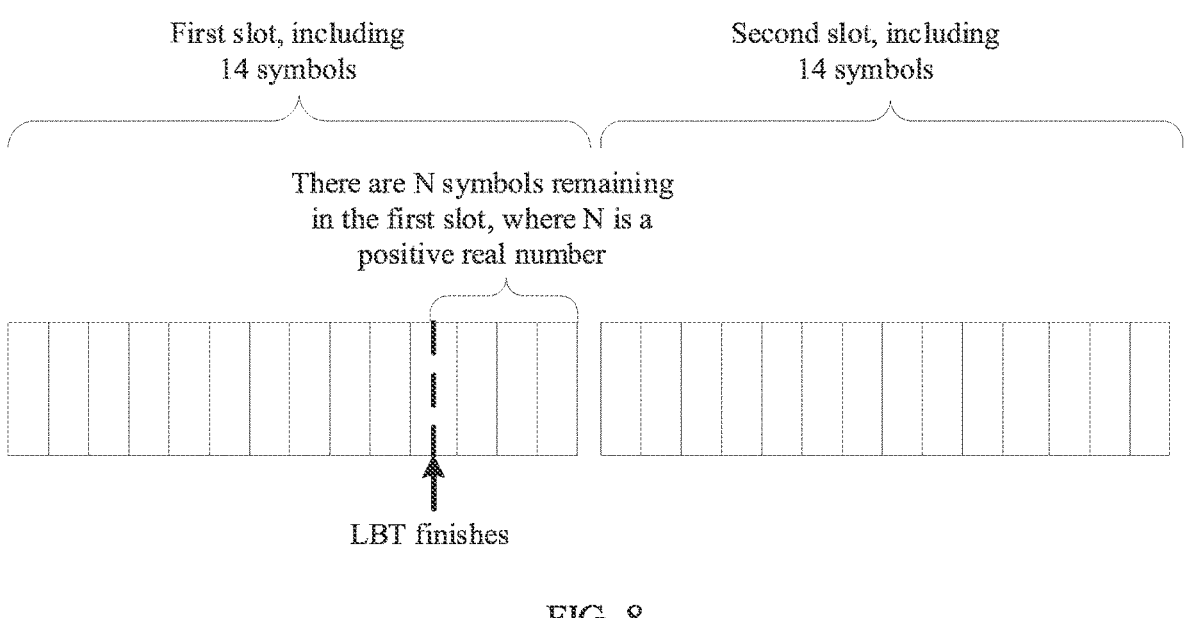
FIG. 8 is a schematic diagram of an example of a first slot and a second slot in the case that an SL device finishes LBT applicable to this application.

FIG. 8 is a schematic diagram of "remaining symbols in a current slot" and "a next slot of the current slot" in the case that a transmitting UE finishes LBT. It should be noted that in embodiments of this application, the "current slot" and the "next slot of the current slot" are respectively described as a "first slot" and a "second slot". As shown in FIG. 8, after the transmitting UE finishes LBT, there are N symbols remaining in the first slot, and the transmitting UE sends an SL signal by continuously using the first slot and the second slot, where N is a positive real number.

It should be understood that, if N is less than 1, the CPE method in the foregoing Manner 2 may be directly used, and a part of the next OFDM symbol is used as an extended CP and is filled onto the current incomplete symbol, so as to access and occupy a channel. Implementation steps are described in the foregoing manner, and details are not described herein again.

It should be further understood that in embodiments of this application, a scenario in which N is greater than 1 is concerned. To be specific, a method for performing channel access in an incomplete slot when a quantity of remaining symbols in the first slot is greater than 1 is provided, to effectively occupy a channel resource in an unlicensed spectrum.

Optionally, to occupy an unlicensed spectrum channel in the first slot, the transmitting UE sends redundant information or a null data packet on the N remaining symbols in the first slot after finishing LBT. This ensures channel occupation.

Figure 9:
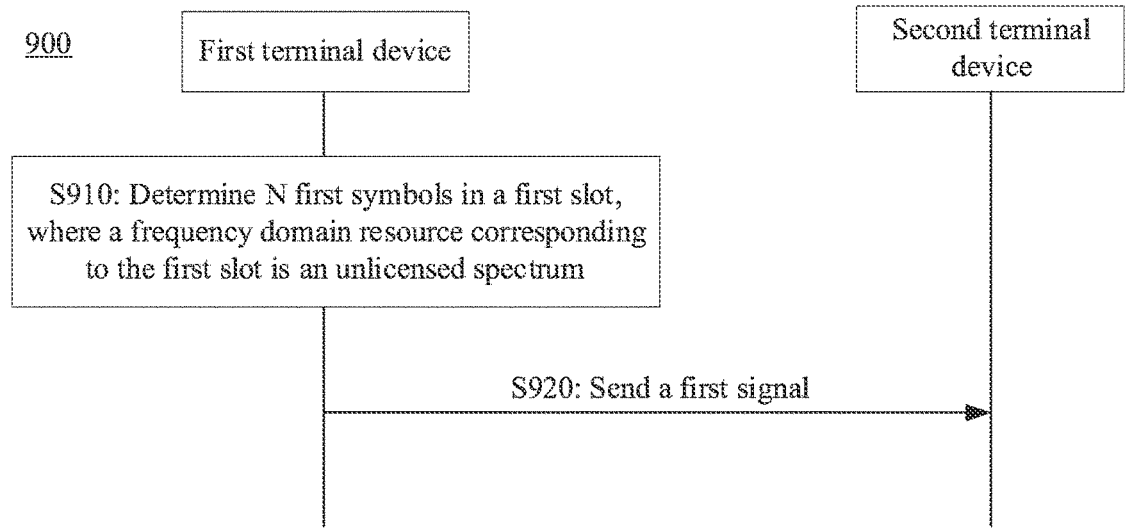
FIG. 9 is a schematic diagram of an example of a wireless communication method applicable to this application.

FIG. 9 is a schematic diagram of an example of a wireless communication method applicable to this application. Implementation steps 900 are as follows.

S910: A first terminal device determines N first symbols in a first slot.

N is a positive real number greater than 1 and less than M, M is a quantity of symbols included in the first slot, M is a positive integer, and the first symbols are unoccupied symbols in the first slot.

It should be understood that the first terminal device determines the unoccupied symbols in the first slot based on a listen before talk LBT mechanism, and a frequency domain resource corresponding to the first slot is an unlicensed spectrum.

S920: The first terminal device sends a first signal to a second terminal device on the N first symbols in the first slot, and the second terminal device receives the first signal from the transmitting UE in the first slot.

The first signal includes at least one of the following: a symbol copied from a second slot, a to-be-sent first transport block (TB), or a cyclic prefix extension (CPE). The second slot is a next slot of the first slot.

Optionally, the second terminal device receives the first signal on the N first symbols in the first slot, or the second terminal device starts to receive the first signal on a gap symbol in the first slot. This is not limited in this application.

It should be noted that, when the first signal includes the symbol copied from the second slot, it indicates that the first terminal device copies one or more symbols in the second slot to the first slot. Correspondingly, the first signal that is originally to be sent on the one or more symbols in the second slot is also to be sent on one or more first symbols. When the first signal includes the to-be-sent first TB, it indicates that the first terminal device needs to send the first TB on one or more first symbols by performing operations such as adding cyclic redundancy check (Cyclic Redundancy Check, CRC) bits, channel coding (channel coding), rate matching (rate matching), modulation (modulation), and mapping (mapping).

It should be further noted that in the first signal sent by the first terminal device, the symbol copied from the second slot and the to-be-sent first TB are mutually exclusive. When the first signal includes the symbol copied from the second slot, it indicates that the first terminal device does not send a TB to the second terminal device in the first slot. In other words, there is no to-be-sent first TB in the first slot, and the operations such as adding cyclic redundancy check bits, channel coding, rate matching, modulation, and mapping do not need to be performed on the first signal transmitted in the first slot. When the first signal includes the to-be-sent first TB, it indicates that the first terminal device sends, to the second terminal device over one or more first symbols, a signal corresponding to the first TB, and does not send, to the second terminal device over one or more first symbols, a signal corresponding to the symbol copied from the second slot. Therefore, the first signal does not include both the symbol copied from the second slot and the to-be-sent first TB.

Optionally, to occupy an unlicensed spectrum channel in the first slot, after finishing LBT, the transmitting UE may send redundant information or a null data packet on the N remaining symbols in the first slot. This ensures channel occupation. The redundant information or the empty data packet also belongs to the first signal.

It should be understood that in the N first symbols, a last symbol in the first slot is used as a gap symbol, and the first terminal device may occupy a symbol through cyclic prefix extension (CPE). To be specific, a cyclic prefix (CP) of a $1^{st}$ symbol (also referred to as an AGC symbol) in the second slot is extended onto the gap symbol, to ensure that a channel idle time on the gap symbol is 16 μs. Herein, the channel idle time of 16 μs may be understood as that the first terminal device sends an empty data packet to the second terminal device.

According to the implementation provided above, this application is applicable to sidelink SL communication. The first terminal device sends the first signal to the second terminal device based on the LBT mechanism, so that an unlicensed spectrum channel resource can be effectively occupied, thereby improving spectrum resource utilization, and potentially improving decoding performance of the second terminal device.

Figure 10:
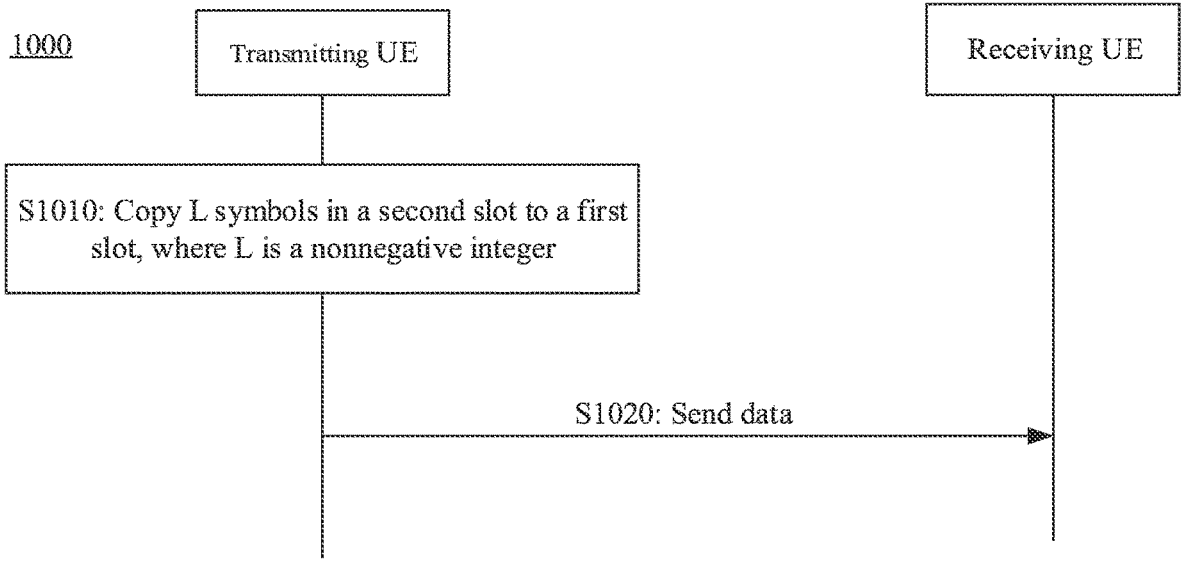
FIG. 10 is a schematic diagram of another example of a wireless communication method applicable to this application.

For example, FIG. 10 is a schematic diagram of an example of an unlicensed spectrum channel occupying method applicable to this application. To be specific, a method for effectively occupying a channel resource by copying a symbol is provided. Implementation steps 1000 are as follows.

S1010: A transmitting UE (an example of a first terminal device) copies L symbols in a second slot to a first slot, where L is a natural number less than or equal to N.

It should be noted that in a D2D system, control information is generally placed in the first several symbols of each slot. Therefore, the transmitting UE selects to copy the first several symbols in the second slot. In this case, a receiving UE also completes decoding relatively easily.

S1020: The transmitting UE sends a first signal to the receiving UE (an example of a second terminal device), and the receiving UE receives the first signal from the transmitting UE.

It should be understood that, after the transmitting UE copies the L symbols in the second slot to the remaining symbols in the first slot, and occupies a channel resource in a timely manner, the transmitting UE sends an SL signal by continuously using the first slot and the second slot. In this case, the receiving UE receives same first signals in two times on the L copied symbols in the first slot and on the L symbols in the second slot, and combines the same first signals received in two times, so that receiving performance of the receiving UE can be potentially improved, and SL transmission reliability can be improved.

According to the foregoing configuration, the transmitting UE can effectively occupy an unlicensed spectrum channel resource in the first slot. In addition, when receiving the first signal, the receiving UE may further combine the L symbols in the second slot with the L copied symbols in the first slot, so that receiving performance of the receiving UE is improved.

It should be understood that the foregoing process of occupying an unlicensed spectrum channel by the first terminal is merely described by using the transmitting UE as an example. This is not particularly limited in this application. Other entities that can implement the unlicensed spectrum channel occupying method fall within the protection scope of this application.

Similarly, in a possible implementation of this application, the second terminal device is merely described by using the receiving UE as an example. This is not particularly limited in this application. Other entities that can implement the unlicensed spectrum channel occupying method fall within the protection scope of this application.

As an example instead of a limitation, in a possible implementation, the transmitting UE sends an SL signal in a complete slot on the second slot and another slot that is in a COT and that is subsequent to the second slot; and the receiving UE receives the SL signal in the complete slot on the second slot and the another slot that is in the channel occupancy time COT and that is subsequent to the second slot.

For example, the transmitting UE sends an SL signal by using all 14 symbols in slots (for example, the second slot and a third slot), and the receiving UE receives the SL signal by using all the 14 symbols in the slots (for example, the second slot and the third slot).

It should be understood that, as a rule limitation, the first slot is an incomplete slot in a channel occupation process of an SL-U device, and subsequently, the transmitting UE needs to occupy a channel at a granularity of a complete slot. For example, the transmitting UE performs channel access in the incomplete first slot, and then sends a signal in the first slot, the complete second slot, the complete third slot, and the like continuously. In other words, signal transmission of the SL-U device is not allowed to finish from a middle slot of any slot.

It should be noted that, a length of a channel occupied by the transmitting UE and the receiving UE for signal transmission is not limited in this application.

As an example instead of a limitation, in another possible implementation, a value of a quantity L of the copied symbols is $\lfloor N \rfloor - 1$, where $\lfloor \ \rfloor$ represents rounding down, and N is a positive real number, and represents a quantity of remaining symbols in the first slot after the transmitting UE finishes LBT. For example, it is assumed that a value of N is 1.5; therefore, a value of L is 0. To be specific, the transmitting UE does not need to copy a symbol from the second slot to the first slot. In this case, the CPE method in Manner 2 provided above may be used for channel access and occupation. It is assumed that a value of N is 3.5; therefore, a value of L is 2. To be specific, the transmitting UE only needs to copy two symbols from the second slot to the first slot for channel access and occupation.

It should be noted that, a reason why the value of L is $\lfloor N \rfloor - 1$ herein is that the SL-U device is most likely to continue to use the NR-SL channel access method provided in the foregoing Manner 3, that is, a gap (gap) symbol is reserved at the rear of each slot, so as to provide a sufficient transition gap for the receiving UE to implement signal receiving/transmitting conversion. In other words, the transmitting UE only needs to occupy a channel resource corresponding to a remaining complete symbol in the first slot other than the gap symbol. For a channel resource corresponding to a remaining incomplete symbol in the first slot other than the gap symbol, channel occupation is performed through CPE in the foregoing Manner 2. Implementation steps are not described herein again.

Optionally, the transmitting UE copies the L symbols in the second slot to the last L symbols in the first slot other than the gap symbol.

As an example instead of a limitation, in another possible implementation, the transmitting UE uses a part of a 1$^{st}$ symbol in the second slot as an extended CP, and fills the gap symbol in the first slot with the extended CP. The extended CP is used to ensure that a channel idle time on the gap symbol is 16 μs.

It should be noted that, a reason for filling the gap symbol with the extended CP is as follows: Based on different subcarrier spacings, a value of duration of a single symbol in an NR system may be about 71.35 μs, about 35.68 μs, about 17.84 μs, or the like. If duration of the entire symbol is used as a transition gap, a channel resource on the gap symbol may be preempted by another LBE device. To resolve this problem, this application provides that a part of a 1st symbol in the second slot is used as an extended CP and is filled onto the gap symbol in the first slot, to ensure that there is only an idle time of 16 μs on the gap symbol in the first slot. When a time interval between two consecutive transmissions of the transmitting UE is not greater than 16 μs, it may be considered that the two consecutive transmissions belong to a transmission burst (transmission burst) process, and another LBE device cannot complete LBT or perform channel access by preemption. In this way, interference caused by another LBE device to a signal of the transmitting UE can be avoided, and reliability of signal transmission of the transmitting UE can also be ensured.

Figure 11:
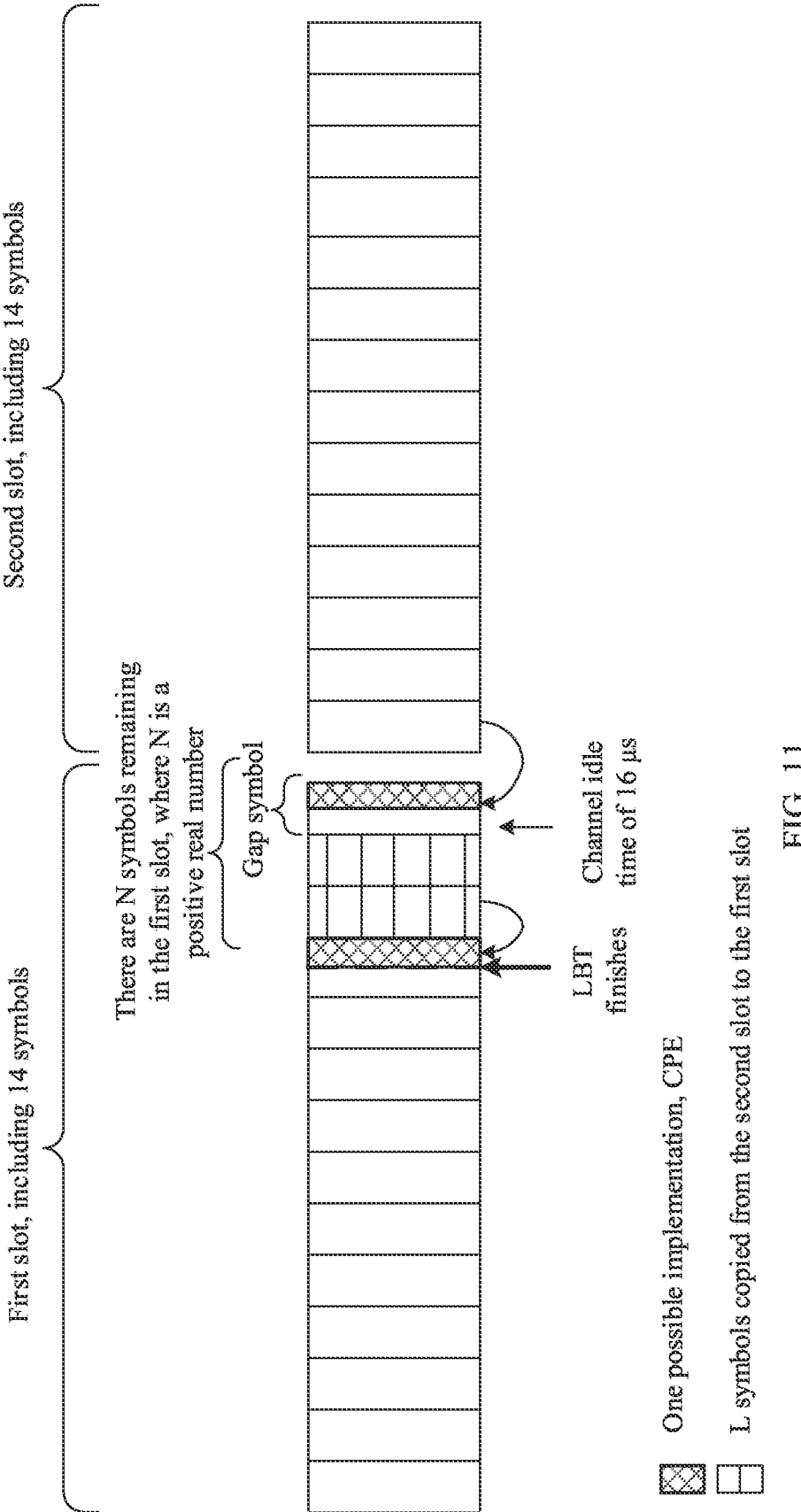
FIG. 11 is a schematic diagram of an example of an unlicensed spectrum channel occupying method applicable to this application.

For example, in FIG. 11, after the transmitting UE finishes LBT, there are still N=3.5 symbols remaining in the first slot. Based on the foregoing another possible implementation, when the value of N is 3.5, the value of L is 2. To be specific, the transmitting UE copies L=2 symbols in the second slot onto the last L=2 symbols in the first slot other than the gap symbol, to implement channel access and occupation. Based on CPE, the transmitting UE uses a part of a $1^{st}$ symbol of the L=2 symbols that are copied to the first slot as an extended CP, and fills the first half symbol of N=3.5 symbols with the extended CP. In addition, the transmitting UE uses a part of a $1^{st}$ symbol in the second slot as an extended CP, and fills the gap symbol with the extended CP, so that the channel is in an idle state for 16 μs on the gap symbol.

As shown in the figure, the transmitting UE copies the L=2 symbols in the second slot to the last but one and last but two symbols in the first slot, then uses a part of the last but two symbol of the first slot as an extended CP through CPE, and fills the second half symbol of the last but three symbol in the first slot with the extended CP. In addition, the transmitting UE uses a part of a $1^{st}$ symbol in the second slot as an extended CP, and fills the gap symbol in the first slot with the extended CP As an example instead of a limitation, in another possible implementation, the transmitting UE copies, to the first slot, the first L symbols in the second slot other than the AGC symbol.

It should be noted that, a reason why the AGC symbol in the second slot is not copied to the first slot is that the AGC symbol may not carry a valid signal, and the receiving UE may not be able to adjust an amplification coefficient based on the copied AGC symbol after the AGC symbol is copied to the first slot, which decreases transmissions of valid signals, and reduces resource utilization.

Figure 12:
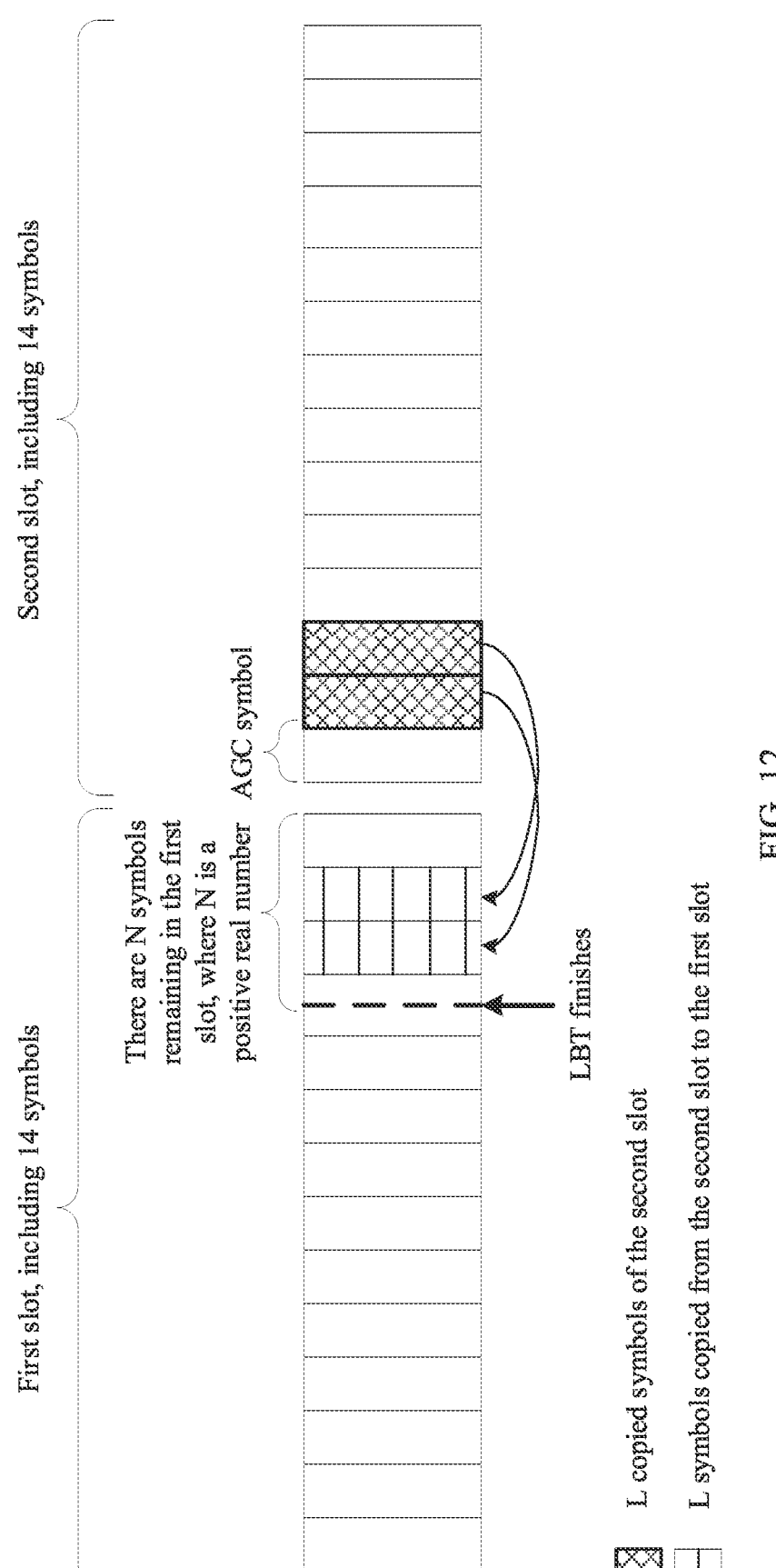
FIG. 12 is a schematic diagram of another example of an unlicensed spectrum channel occupying method applicable to this application.

For example, in FIG. 12, after the transmitting UE finishes LBT, there are still N=3.5 symbols remaining in the first slot. Based on the foregoing another possible implementation, when the value of N is 3.5, the value of L is 2. To be specific, the transmitting UE copies the first L=2 symbols in the second slot other than the AGC symbol to the last L=2 symbols in the first slot other than the gap symbol, to implement channel access and occupation.

As shown in the figure, the transmitting UE copies a 1st symbol (that is, a $2^{nd}$ symbol in the second slot) of the L=2 symbols to the last but two symbol in the first slot, and copies a $2^{nd}$ symbol (that is, a $3^{rd}$ symbol in the second slot) of the L=2 symbols to the last but one symbol in the first slot. Optionally, a part of the last but two symbol in the first slot is used as an extended CP through CPE, and is filled onto the second half symbol of the last but three symbol.

As an example instead of a limitation, in another possible implementation, the transmitting UE reverses a sequence of the L symbols in the second slot, and then copies the L sequence-reversed symbols to the first slot.

It should be understood that this implementation facilitates function implementation of the transmitting UE. For example, before finishing LBT, the transmitting UE reverses a sequence of W symbols in the second slot, and then copies the W sequence-reversed symbols to a position such as a buffer (buffer). After a finishing time point of LBT is determined, the transmitting UE places the last L symbols of the W sequence-reversed symbols in the second slot into the last L symbols in the first slot other than the gap symbol. A value of W is not less than the value of L.

Figure 13:
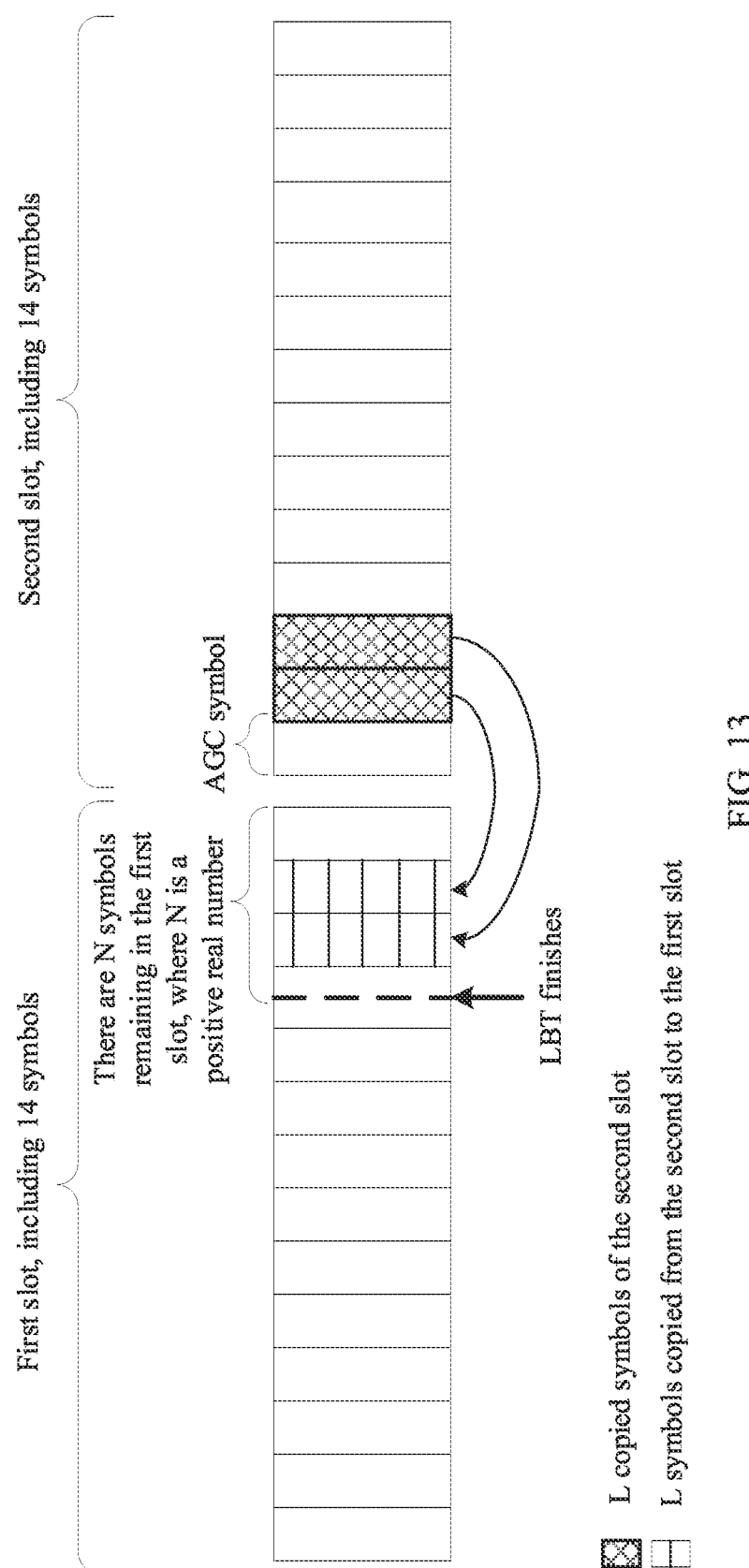
FIG. 13 is a schematic diagram of still another example of an unlicensed spectrum channel occupying method applicable to this application.

For example, in FIG. 13, after the transmitting UE finishes LBT, there are still N=3.5 symbols remaining in the first slot. Based on the foregoing another possible implementation, when the value of N is 3.5, the value of L is 2. To be specific, the transmitting UE copies the first L=2 symbols in the second slot other than the AGC symbol to the last L=2 symbols in the first slot other than the gap symbol, to implement channel access and occupation.

As shown in the figure, the transmitting UE copies a $1^{st}$ symbol (that is, a $2^{nd}$ symbol in the second slot) of the L=2 symbols to the last but one symbol in the first slot, and copies a $2^{nd}$ symbol (that is, a $3^{rd\ symbol\ in\ the\ second\ slot}$) of the $^{L=}$2 symbols to the last but two symbol in the first slot. Optionally, a part of the last but two symbol in the first slot is used as an extended CP through CPE, and is filled onto the second half symbol of the last but three symbol.

As an example instead of a limitation, in another possible implementation, the transmitting UE determines first indication information based on the value of L, where the first indication information is used by the transmitting UE to determine an AGC sequence; and the transmitting UE sends the AGC sequence to the receiving UE at a position of the AGC symbol in the second slot. Correspondingly, the receiving UE receives the AGC sequence at the position of the AGC symbol in the second slot. Therefore, when receiving the AGC sequence, the receiving UE may determine the value of L based on the AGC sequence, that is, determine a quantity of symbols copied by the transmitting UE from second slot to the first slot.

It should be understood that the first indication information herein may be considered as an index. To be specific, L is in a one-to-one correspondence with the AGC sequence.

Figure 14:
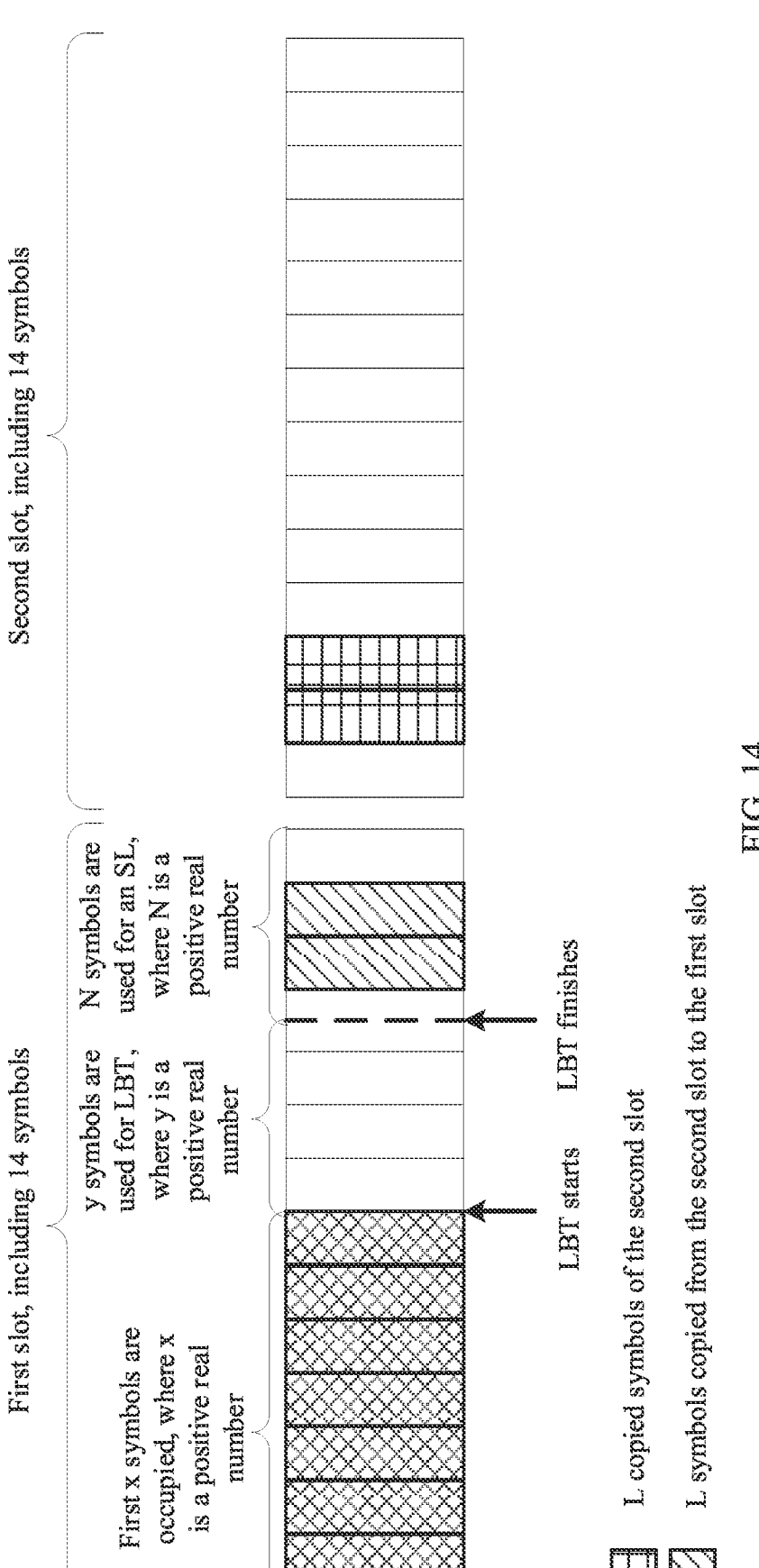
FIG. 14 is a schematic diagram of yet another example of an unlicensed spectrum channel occupying method applicable to this application.

For example, as shown in FIG. 14, it is assumed that a network device that occupies the first x symbols in the first slot is an NR-U device, where x is a positive integer 7. An SL-U device immediately starts to perform LBT after the NR-U device completes channel occupation, and lasts for y=3.5 symbols. After LBT finishes, there are still N=3.5 symbols remaining in the first slot. In this case, the transmitting UE occupies an unlicensed spectrum channel by using any one of the foregoing possible implementations, and the receiving UE only needs to concern a signal transmitted on the L symbols in the first slot and a signal transmitted in the complete second slot. If the receiving UE does not know the value of L, the receiving UE does not know which symbol in the first slot should be combined with several symbols in the second slot. In this implementation, based on a one-to-one correspondence between L and an AGC sequence, the receiving UE may determine the value of L based on the received AGC sequence. The value of L may be considered as indication information sent by the transmitting UE to the receiving UE, and indicates a quantity of symbols that are further occupied in the first slot to transmit a same signal.

It should be noted that in the technical solution of this application, a time at which the receiving UE receives a signal is not limited.

It should be understood that, after the receiving UE determines the quantity of symbols that are copied by the transmitting UE from the second slot to the first slot, based on a same protocol specification of the transmitting and receiving UEs, the receiving UE can definitely know a symbol in the first slot on which a signal transmitted by the transmitting UE is the same as a signal transmitted in the second slot. This helps the receiving UE implement signal combination, potentially improves receiving performance, and improves SL transmission reliability.

It should be noted that in the technical solution of this application, a quantity of symbols in a slot of an SL-U system is fixed to be 14. In a most typical scenario, there are 14 symbols in one slot, and an SL-U device is applicable to scenarios of 15 kHz subcarrier spacing and 30 kHz subcarrier spacing. In this case, the transmitting UE and the receiving UE use all the 14 symbols in the slot to send and/or receive an SL signal.

Particularly, in some possible implementations, the quantity of symbols in the first slot and the quantity of symbols in the second slot may alternatively be 12. In other words, in a special case, an extended cyclic prefix (Extended Cyclic Prefix, ECP)-based slot is used. The slot has only 12 symbols, and a CP of each symbol is relatively long. This is generally applicable only to a scenario of 60 kHz subcarrier spacing. This is not limited in this application. In this case, the transmitting UE and the receiving UE use all the 12 symbols in the slot to send and/or receive an SL signal.

According to the foregoing solution, this application provides an unlicensed spectrum channel access method, that is, a method for effectively occupying a channel resource by copying a symbol. After finishing LBT, the transmitting UE copies one or more symbols in a next slot of a current slot to the current slot, and effectively occupies the channel resource in an incomplete slot. This improves a possibility of obtaining the channel resource by the SL-U device, and potentially improves decoding performance of the receiving UE in the SL-U system for some symbols, so that SL transmission reliability is improved.

Figure 15:
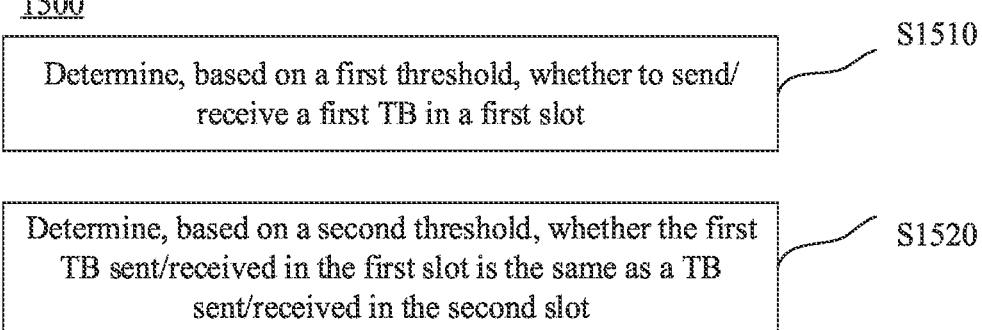
FIG. 15 is a schematic diagram of still another example of a wireless communication method applicable to this application.

FIG. 15 is a schematic diagram of an example of an unlicensed spectrum channel access method applicable to this application. To be specific, two thresholds are proposed, which are described as a "first threshold" and a "second threshold". The first threshold is used to determine whether to send a first TB in a first slot. When the first slot is used to send the first TB, the second threshold is used to determine whether the first TB sent in the first slot is the same as a TB transmitted in a second slot. Implementation steps 1500 are as follows.

S1510: A transmitting UE (an example of a first terminal device) determines, based on a first threshold, whether to send a first TB in a first slot. Correspondingly, a receiving UE (an example of a second terminal device) determines, based on the first threshold, whether to receive the first TB in the first slot.

S1520: The transmitting UE determines, based on a second threshold, whether the first TB sent in the first slot is the same as a TB sent in the second slot. Correspondingly, the receiving UE determines, based on the second threshold, whether the first TB sent in the first slot is the same as the TB sent in the second slot.

As an example instead of a limitation, in a possible implementation, when N is less than the first threshold, the transmitting UE does not send the first TB on N remaining symbols in the first slot. In other words, the N remaining symbols in the first slot are insufficient for transmitting a complete TB. In this case, the transmitting UE needs to copy, according to the solution provided in the foregoing embodiment, one or more symbols, namely, L symbols, in the second slot to the N first symbols in the first slot, to occupy an unlicensed spectrum channel, and then transmits a signal continuously on some symbols in the first slot and all symbols in the second slot. Correspondingly, the receiving UE receives the signal continuously on some symbols in the first slot and all the symbols in the second slot. Implementation steps are described in the foregoing manner, and details are not described herein again.

As an example instead of a limitation, in another possible implementation, when N is greater than or equal to the first threshold, the transmitting UE sends a TB on the N remaining symbols in the first slot, and the receiving UE receives the TB in the first slot. In other words, the N remaining symbols in the first slot are sufficient for transmitting a complete TB.

It should be understood that when a quantity N of remaining symbols in the first slot is relatively small, namely, the first slot is insufficient for transmitting a complete TB, the transmitting UE may copy L symbols in the second slot to the first slot according to the method provided above, to avoid a signal transmission failure caused by insufficient channel resources. L is a quantity of symbols copied from the second slot, and L is a positive integer less than or equal to N.

It should be further understood that when there are a large quantity of remaining symbols in the first slot is relatively large, namely, the first slot is sufficient for transmitting a TB, the transmitting UE may transmit a complete TB by using L symbols in the first slot, so as to improve channel resource utilization efficiency. L is a quantity of symbols used to send the to-be-sent first TB, and L is a positive integer less than or equal to N.

It should be noted that in the foregoing implementation, there may be a one-to-one correspondence between N and L. In this case, comparing N with the first threshold is equivalent to comparing L with a third threshold. Herein, there is a one-to-one correspondence between the third threshold and the first threshold. When a value of only L is given, the receiving UE may determine, based on the third threshold in the one-to-one correspondence with the first threshold, whether to receive the first TB in the first slot.

For example, the one-to-one correspondence between N and L is $L=\lfloor N \rfloor - 1$, and the third threshold is equal to the first threshold minus 1. In this case, N being less than the first threshold is equivalent to L being less than the third threshold, and N being greater than or equal to the first threshold is equivalent to L being greater than or equal to the third threshold.

Optionally, the first threshold is a positive integer configured by RRC, preconfigured, or protocol-specified.

Optionally, a candidate value set (candidate value set) of the first threshold includes at least one of the following: 5, 6, 7, or 8.

For example, if there are N=9.5 symbols remaining in the first slot after the transmitting UE finishes LBT, and the first threshold is 7, a TB may be transmitted on the N=9.5 remaining symbols in the first slot. If there are N=3.5 symbols remaining in the first slot after the transmitting UE finishes LBT, and the first threshold is 7, the N=3.5 remaining symbols in the first slot are insufficient for transmitting a TB, and the transmitting UE needs to copy L symbols from the second slot to the first slot, to occupy a channel resource, and send a signal continuously on incomplete symbols in the first slot, complete symbols in the first slot, and all symbols in the second slot, and the receiving UE receives the signal continuously on the incomplete symbols in the first slot, the complete symbols in the first slot, and all the symbols in the second slot.

As an example instead of a limitation, in another possible implementation, when N is greater than or equal to the first threshold, the transmitting UE sends a TB in the first slot, and the receiving UE receives the TB in the first slot. In this case, the TB transmitted by the transmitting UE in the first slot is allowed to be the same as the TB transmitted in the second slot.

It should be understood that in the foregoing case, only the first threshold exists by default, and existence of the second threshold is not considered. In other words, the foregoing implementation steps 1500 do not include step S1520.

Optionally, sidelink control information (Sidelink Control Information, SCI) transmitted by the transmitting UE in the first slot is the same as sidelink control information SCI transmitted in the second slot.

Based on this, control information and data information transmitted by the transmitting UE in the first slot are the same as those transmitted in the second slot. This helps improve decoding performance of the receiving UE, so that SL transmission reliability is improved.

As an example instead of a limitation, in another possible implementation, when N is greater than or equal to the first threshold, and both the first threshold and the second threshold exist, the transmitting UE determines, based on the second threshold, whether to send, in the first slot, a TB the same as that transmitted in the second slot, and the receiving UE determines, based on the second threshold, whether to receive, in the first slot, a TB the same as that transmitted in the second slot.

For example, when N is less than the second threshold, the TB transmitted by the transmitting UE in the first slot is the same as the TB transmitted in the second slot, and the TB received by the receiving UE in the first slot is the same as the TB transmitted in the second slot. When N is greater than or equal to the second threshold, the TB transmitted by the transmitting UE in the first slot is different from the TB transmitted in the second slot, and the TB received by the receiving UE in the first slot is different from the TB transmitted in the second slot.

It should be understood that, when the quantity N of remaining symbols in the first slot is large enough to ensure that the receiving UE successfully sends the TB in the incomplete slot with a relatively high probability, the transmitting UE sends different TBs to the receiving UE separately on the L symbols in the first slot and all symbols in the second slot. Correspondingly, the receiving UE receives different TBs from the transmitting UE separately on the L symbols in the first slot and all the symbols in the second slot. This increases content of information transmitted in the first slot and the second slot, and improves channel resource utilization efficiency, where L is a positive integer less than or equal to N.

It should be noted that in the foregoing implementation, N and L are in a one-to-one correspondence. In this case, comparing N with the second threshold is equivalent to comparing L with a fourth threshold. Herein, there is a one-to-one correspondence between the fourth threshold and the second threshold. When a value of only L is given, the receiving UE may determine, based on the fourth threshold in the one-to-one correspondence with the second threshold, whether the first TB received in the first slot is the same as the TB received in the second slot.

For example, the one-to-one correspondence between N and L is L=⌈N⌉−1, and the fourth threshold is equal to the second threshold minus 1. In this case, N being less than the second threshold and is equivalent to L being less than the fourth threshold, and N being greater than or equal to the second threshold and is equivalent to L being greater than or equal to the fourth threshold.

Optionally, the second threshold is a positive integer configured by RRC, preconfigured, or protocol-specified.

Optionally, a candidate value set of the second threshold includes at least one of the following: 7, 8, 9, or 10.

For example, if there are N=9.5 symbols remaining in the first slot after the transmitting UE finishes LBT, and the first threshold is 7, the N=9.5 remaining symbols in the first slot may be used for transmission of a TB. In other words, the first slot is used for transmission of a TB. When the second threshold is 8, the TB transmitted by the transmitting UE in the first slot is different from the TB transmitted in the second slot, and the TB transmitted by the receiving UE in the first slot is different from the TB received in the second slot. When the second threshold is 10, the TB transmitted by the transmitting UE in the first slot is the same as the TB transmitted in the second slot, and the TB transmitted by the receiving UE in the first slot is the same as the TB received in the second slot.

Based on this, the control information and the data information transmitted by the transmitting UE in the first slot may be the same as or may be different from those transmitted in the second slot. This ensures SL transmission reliability, improves SL transmission flexibility, and potentially improves channel resource utilization efficiency.

As an example instead of a limitation, in another possible implementation, the transmitting UE uses a part of a 1$^{st}$ symbol in the second slot as an extended CP, and fills a gap symbol in the first slot with the extended CP. The extended CP is used to ensure that a channel idle time on the gap symbol is 16 μs.

Herein, a reason for filling the gap symbol with the extended CP to ensure that there is only an idle time of 16 μs on the gap symbol in the first slot is the same as the reason in the foregoing implementation steps 1000, and details are not described herein again.

Figure 16:
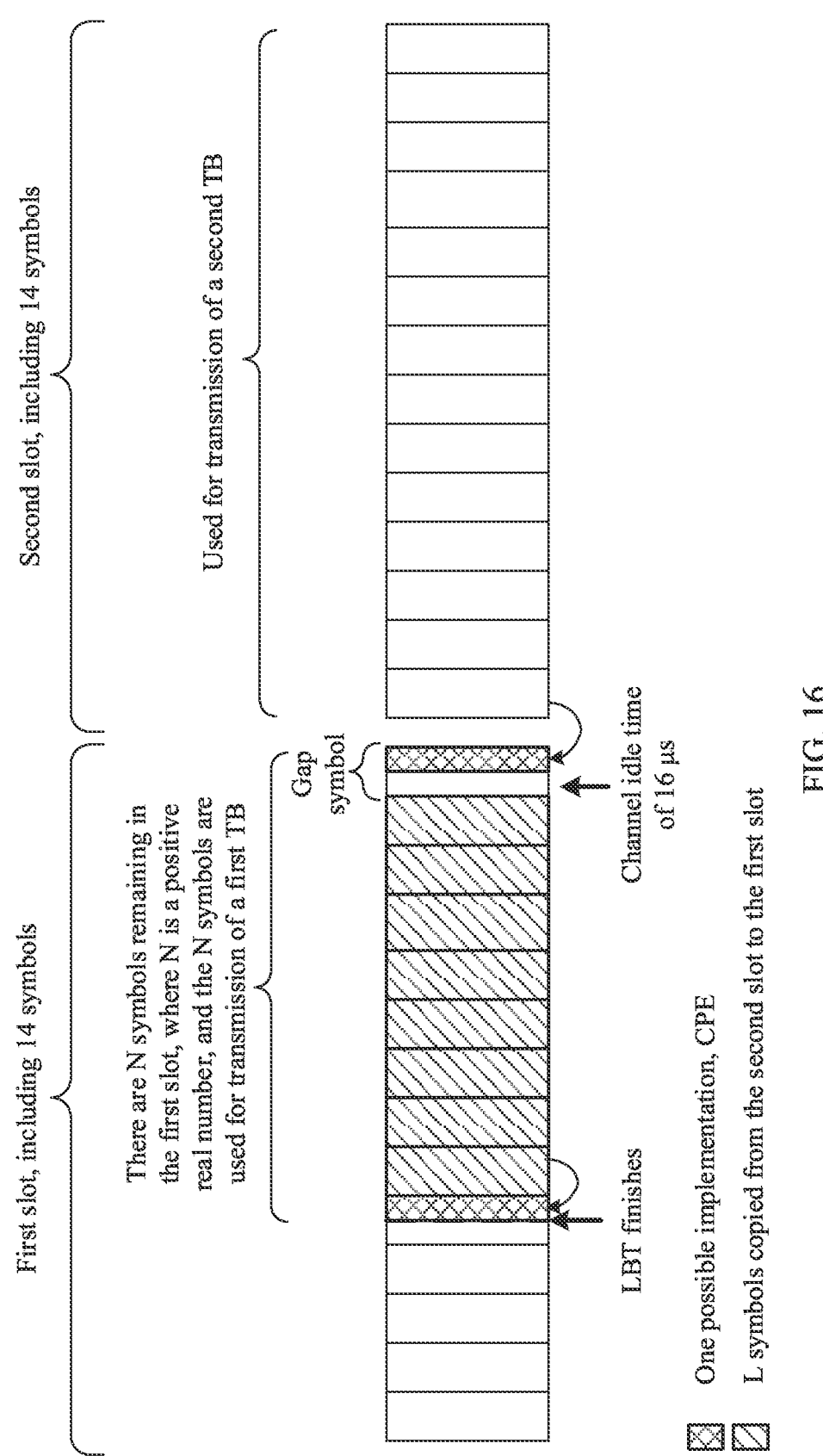
FIG. 16 is a schematic diagram of still yet another example of an unlicensed spectrum channel occupying method applicable to this application.

For example, in FIG. 16, after the transmitting UE finishes LBT, there are still N=9.5 symbols remaining in the first slot, the first threshold is 7, and the second threshold is 9. In this case, the N=9.5 remaining symbols in the first slot may be used for transmission of a TB, and the TB is different from the TB transmitted by the transmitting UE in the second slot. Based on CPE, the transmitting UE uses a part of the first complete symbol of the N=9.5 symbols as an extended CP, and fills the first half symbol of the N=9.5 symbols with the extended CP. In addition, the transmitting UE uses a part of a 1$^{st}$ in the second slot as an extended CP, and fills the gap symbol with the extended CP, so that the channel is in an idle state for 16 μs on the gap symbol.

As an example instead of a limitation, in another possible implementation, the transmitting UE determines first indication information based on the value of L, where L is a quantity of symbols copied by the transmitting UE from the second slot or a quantity of symbols used to send a to-be-sent TB, and the first indication information is used by the transmitting UE to determine an AGC sequence. The transmitting UE sends the AGC sequence to the receiving UE at a position of an AGC symbol in the second slot. Correspondingly, the receiving UE receives the AGC sequence at the position of the AGC symbol in the second slot. Therefore, when receiving the AGC sequence, the receiving UE may determine the value of L based on the received AGC sequence.

Optionally, the transmitting UE determines, based on the first threshold (or the third threshold) and the value of N (or the value of L), whether to send the first TB in the first slot. Correspondingly, the receiving UE determines, based on the first threshold (or the third threshold) and the value of L, whether to receive the first TB in the first slot.

For example, if the receiving UE determines not to receive the first TB in the first slot, the receiving UE may determine, based on the value of L, a quantity of symbols copied from the second slot to the first slot. There is a one-to-one correspondence between the third threshold and the first threshold. Implementation steps related to the third threshold are described in the foregoing manner, and details are not described herein again.

Further, if the transmitting UE determines to send the first TB in the first slot, the transmitting UE determines, based on the second threshold (or the fourth threshold) and the value of N (or the value of L), whether the first TB sent in the first slot is the same as the TB sent in the second slot. Correspondingly, the receiving UE determines, based on the second threshold (or the fourth threshold) and the value of L, whether the first TB received in the first slot is the same as the TB received in the second slot. There is a one-to-one correspondence between the fourth threshold and the second threshold. Implementation steps related to the fourth threshold are described in the foregoing manner, and details are not described herein again.

Based on the foregoing solution, this application proposes two thresholds, so that an SL-U device can determine whether to transmit a separate TB in an incomplete slot, and can further determine whether to transmit repeated TBs in two adjacent slots, thereby improving SL transmission reliability. In other words, after finishing LBT, the transmitting UE determines, based on the first threshold, whether to transmit a TB in the incomplete slot, and determines, based on the second threshold, whether to transmit, in the current incomplete slot, a TB the same as that transmitted in the next slot. Accordingly, the receiving UE determines, based on the two thresholds, whether to receive a TB in the incomplete slot and whether to receive, in the current incomplete slot, a TB the same as that received in the next slot. In addition, the incomplete slot is used to effectively occupy a channel resource, so that a possibility of obtaining the channel resource by the SL-U device is improved, and decoding performance of the receiving UE of the SL-U system for some symbols is potentially improved, thereby improving SL transmission reliability.

Figures 17, 18, 19:
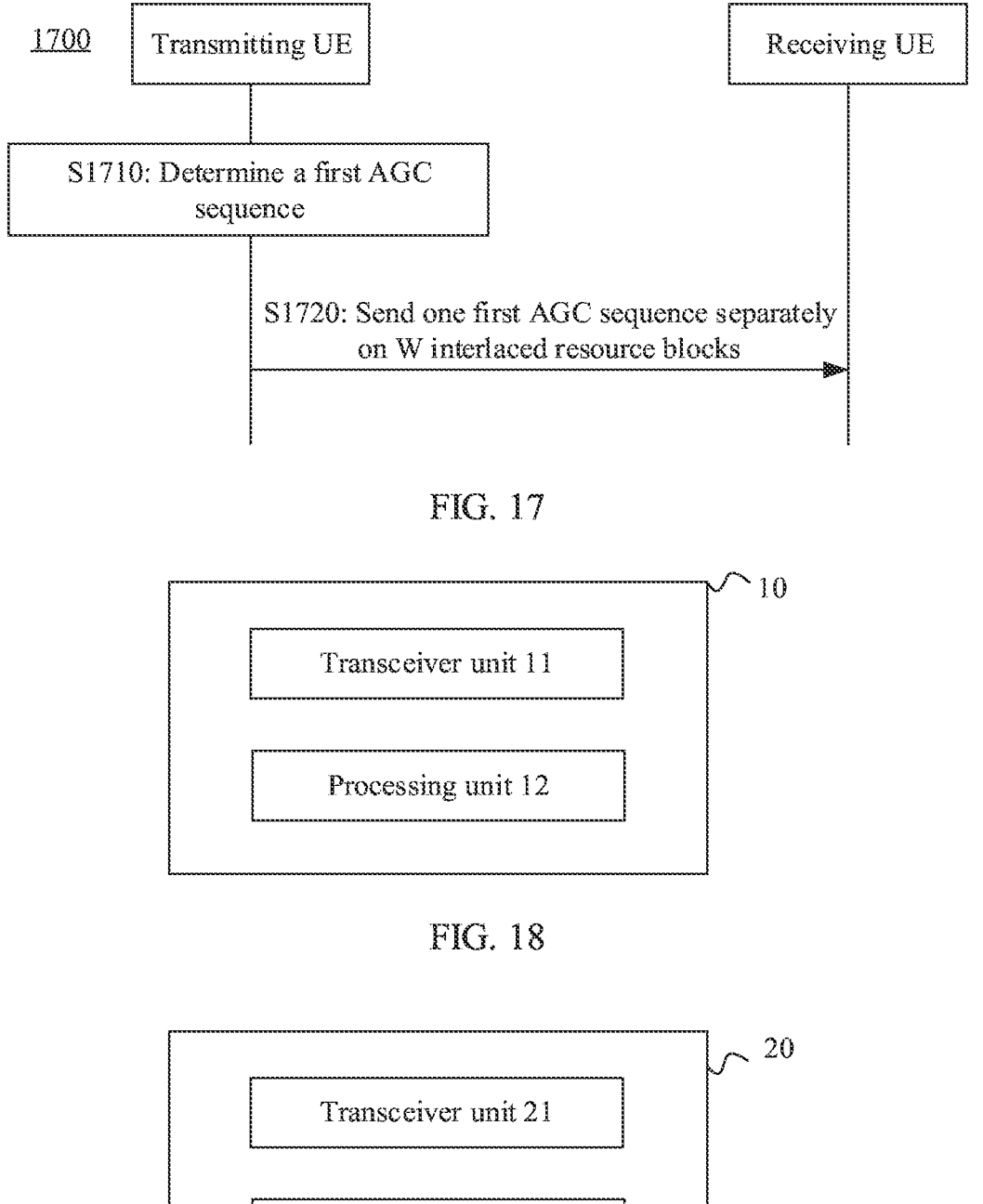
FIG. 17 is a schematic diagram of an example of an AGC sequence transmission method applicable to this application.
FIG. 18 is a schematic diagram of an example of a wireless communication apparatus applicable to this application.
FIG. 19 is a schematic diagram of another example of a wireless communication apparatus applicable to this application.

FIG. 17 is a schematic diagram of an example of an AGC sequence transmission method in an SL applicable to this application. Implementation steps 1700 are as follows.

S1710: A transmitting UE (an example of a first terminal device) determines a first AGC sequence.

The first AGC sequence is determined based on first indication information. The first indication information is used to indicate a value of L, where L is a natural number less than or equal to N, and indicates a quantity of complete SL symbols transmitted in a slot prior to a slot in which the first AGC sequence is sent. In other words, the first AGC sequence carries the indication information indicating a quantity of complete symbols copied by the transmitting UE from a second slot to a first slot or a quantity of complete symbols used in the first slot to send a TB, so that when receiving a signal, a receiving UE can purposefully process signals transmitted in the first slot and the second slot, thereby improving signal receiving performance.

It should be understood that in an NR SL system, an AGC symbol is used as the first symbol for SL transmission. In implementation, the second symbol for SL transmission is copied to the first symbol, and copied content includes a control signal, a data signal, a reference signal, and the like that are transmitted on the second symbol. Another implementation method of the AGC symbol is using an AGC sequence. In other words, a specific symbol sequence is transmitted on the AGC symbol. Optionally, a ZC sequence (Zadoff-Chu sequence) is used. The use of the AGC sequence can potentially improve accuracy of adjusting an amplification coefficient by the receiving UE. In addition, because the receiving UE may receive the AGC symbol in a sequence detection manner, the receiving UE is capable of further compensating for a Doppler frequency shift.

It should be noted that, a quantity of AGC sequences sent by the transmitting UE to the receiving UE is not limited in this application.

S1720: The transmitting UE sends the first AGC sequence to the receiving UE (an example of a second terminal device), and the receiving UE receives the first AGC sequence from the transmitting UE.

It should be noted that, from the perspective of time domain, the transmitting UE sends the first AGC sequence to the receiving UE on the AGC symbol in the second slot; and from the perspective of frequency domain, the transmitting UE sends the AGC sequence to the receiving UE on an interlaced resource block (interlaced resource block, interlace for short).

As an example instead of a limitation, in a possible implementation, the first AGC sequence satisfies:

$$r_{(u,v)}^{(\alpha,\delta)}(n)=e^{j\alpha n}\bar{r}_{u,v}(n), 0\leq n < M_{ZC}.$$

$\alpha$ is a cyclic shift (cyclic shift), and is determined based on the first indication information; $\delta$ is used to determine a length $M_{ZC}$ of a ZC sequence; and u and v are used to determine a base sequence $\bar{r}_{u,v}(n)$ of the ZC sequence.

It should be noted that the first indication information may be understood as an index. Herein, there is a one-to-one mapping relationship between $\alpha$ and L in this application. For example, when L=0, L is mapped to $\alpha1$; when L=1, L is mapped to $\alpha2$; and when L=2, L is mapped to $\alpha3$. $\alpha$ may be represented by using a binary number or another character. For example, when L=8, L is mapped to $\alpha8$='1000'. In other words, the transmitting UE determines the first AGC sequence by using the first indication information, and sends corresponding control information and data information to the receiving UE. Therefore, a value of $\alpha$ is not limited to be equal to that of L in this application.

As an example instead of a limitation, in another possible implementation, the transmitting UE sends W AGC sequences to the receiving UE, where W is a positive integer.

Further, W is the same as a quantity of interlaced resource blocks used by the transmitting UE during data transmission. To be specific, the transmitting UE sends one first AGC sequence to the receiving UE on each interlaced resource block. In other words, a quantity of first AGC sequences that need to be transmitted by the transmitting UE is equal to a quantity of used interlaced resource blocks. The quantity of used interlaced resource blocks is the same as the quantity of first AGC sequences, and the both are in a one-to-one correspondence.

Based on this, the receiving UE may receive one AGC sequence on each interlaced resource block. This can avoid a process in which the receiving UE blindly detects which interlaced resource blocks are used by the transmitting UE, so that performance of receiving the AGC sequence by the receiving UE is improved, and indication information potentially carried in the AGC sequence is obtained more accurately.

It should be noted that the interlaced resource block is a specific frequency domain resource usage manner when an NR-U device accesses a channel. The existing protocol defines two types of interlaced resource blocks.

Manner 1

For a subcarrier spacing of 15 kHz, an interlaced resource block includes common resource blocks (common resource block) whose indexes are {m, m+10, m+20, . . . }, and a value range of m is {0, 1, . . . , 9}. Therefore, there are ten interlaced resource blocks in a frequency domain resource.

For example, there are 106 common resource blocks in a 20 MHz bandwidth, and when transmitting data, the transmitting UE may use two interlaced resource blocks whose common resource block indexes are {0, 10, 20, . . . , 100} and {1, 11, 21, . . . , 101}. Based on this implementation, the transmitting UE transmits one first AGC sequence on each of the two interlaced resource blocks.

Manner 2

For a subcarrier spacing of 30 kHz, an interlaced resource block includes common resource blocks whose indexes are {m, m+5, m+10, . . . }, where a value range of m is {0, 1, . . . , 4}. Therefore, there are five interlaced resource blocks in a frequency domain resource.

For example, there are 51 common resource blocks in a 20 MHz bandwidth, and when transmitting data, the transmitting UE may use two interlaced resource blocks whose common resource block indexes are {0, 5, 10, . . . , 50} and {1, 6, 11, . . . , 51}. Based on this implementation, the transmitting UE transmits one first AGC sequence on each of the two interlaced resource blocks.

As an example instead of a limitation, in another possible implementation, a sequence length of the AGC sequence is an integer multiple of 120 or an integer multiple of 132.

It should be noted that the sequence length of the AGC sequence is limited because a quantity of common resource blocks in one interlaced resource block may be only an integer multiple of 10 or an integer multiple of 11, and a quantity of subcarriers in a single common resource block is 12. Therefore, the sequence length of the AGC sequence is an integer multiple of $10\times12=120$ or an integer multiple of $11\times12=132$.

Based on this, the receiving UE may generate a first AGC sequence in advance or quickly generate a first AGC sequence, and perform proper processing on the first AGC sequence received from the transmitting UE and the first AGC sequence generated by the receiving UE, to reduce a processing delay of the first AGC sequence.

Optionally, the transmitting UE determines the sequence length of the AGC sequence based on a quantity of common resource blocks in the interlaced resource block.

According to the foregoing solution, this application proposes a first AGC sequence used in an SL-U system. The indication information carried in the first AGC sequence indicates a quantity of complete symbols transmitted in a previous slot of a current slot, so that when receiving the first AGC symbol, an SL-U device can learn of the quantity L of complete SL symbols transmitted in the previous slot. This helps the receiving UE optimize an inter-symbol combination method, and improves decoding performance of the SL-U system, so that SL transmission reliability is improved.

Further, this application further provides a method for sending a first AGC sequence. A separate first AGC sequence is sent on each interlaced resource block, so as to help the receiving UE improve performance of receiving the first AGC sequence, and enable the receiving UE to more accurately obtain the indication information potentially carried in the first AGC sequence.

It should be understood that specific examples in embodiments of this application are merely intended to help a person skilled in the art better understand embodiments of this application, but are not intended to limit the scope of embodiments of this application.

It should be further understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

The foregoing describes in detail the wireless communication methods according to embodiments of this application, and the following describes wireless communication apparatuses according to embodiments of this application.

According to the foregoing method, FIG. 18 is a schematic diagram of a wireless communication apparatus 10 (for example, a first terminal device/transmitting UE) applicable to an embodiment of this application. As shown in FIG. 18, the wireless communication apparatus includes a transceiver unit 11 and a processing unit 12.

For example, the transceiver unit 11 is configured to send a first signal to a second terminal device on N first symbols. The first signal includes at least one of the following: a symbol copied from a second slot, a to-be-sent first transport block (TB), or a cyclic prefix extension (CPE. The second slot is a next slot of a first slot.

The processing unit 12 is configured to determine the N first symbols in the first slot. N is a positive real number greater than 1 and less than M, M is a quantity of symbols included in the first slot, M is a positive integer, a frequency domain resource corresponding to the first slot is an unlicensed spectrum, and the first symbols are unoccupied symbols in the first slot.

The processing unit 12 is further configured to determine, based on a first threshold, whether the first signal includes the to-be-sent first TB, where the first threshold is configured by radio resource control (RRC), preconfigured, or protocol-specified.

For example, when N is less than the first threshold, the first signal does not include the to-be-sent first TB. In other words, a quantity of symbols copied by the transceiver unit 11 from the second slot is L, where L is a positive integer less than or equal to N.

It should be understood that the L symbols include one or more symbols other than an automatic gain control (AGC) symbol in the second slot, and the N first symbols in the first slot include a gap symbol.

The processing unit 12 is further configured to extend a cyclic prefix (CP) of the AGC symbol in the second slot onto the gap symbol in the first slot, to ensure that a channel idle time on the gap symbol is 16 μs.

For example, when N is greater than or equal to the first threshold, the first signal includes the to-be-sent first TB. In other words, the transceiver unit 11 is configured to send the first TB to the second terminal device on the N first symbols in the first slot.

The transceiver unit 11 is further configured to send a second TB to the second terminal device in the second slot, where the second TB is the same as the first TB.

The processing unit 12 is further configured to determine, based on a second threshold, whether a TB sent in the second slot is the same as the first TB, where the second threshold is configured by radio resource control (RRC), preconfigured, or protocol-specified.

For example, when N is less than the second threshold, a second TB is sent to the second terminal device in the second slot, where the second TB is the same as the first TB.

For example, when N is greater than or equal to the second threshold, a third TB is sent to the second terminal device in the second slot, where the third TB is different from the first TB.

The transceiver unit 11 is further configured to send a first AGC sequence on the AGC symbol in the second slot. The first AGC sequence is determined based on a value of L, L is a quantity of symbols copied from the second slot or a quantity of symbols used to send the to-be-sent first transport block TB, and L is a natural number less than or equal to N.

The transceiver unit 11 is further configured to send one first AGC sequence on each of W interlaced resource blocks, where W is a positive integer.

It should be understood that a quantity of the interlaced resource blocks is the same as a quantity of sent AGC sequences.

It should be understood that a structure of the apparatus 10 shown in FIG. 18 is merely a possible form, and should not constitute any limitation on this embodiment of this application. This application does not exclude a possibility of a terminal device in another form that may appear in the future.

It should be understood that the wireless communication apparatus 10 according to this embodiment of this application may correspond to the transmitting UE in the foregoing method embodiments. In addition, the foregoing and other management operations and/or functions of the units/modules in the wireless communication apparatus 10 are separately used to implement corresponding steps of the foregoing methods. Therefore, advantageous effects in the foregoing method embodiments can also be implemented.

It should be further understood that in this embodiment of this application, the processing unit may be implemented by a processor, and the transceiver unit may be implemented by a transceiver.

According to the foregoing method, FIG. 19 is a schematic diagram of a wireless communication apparatus 20 (for example, a second terminal device/receiving UE) applicable to an embodiment of this application. As shown in FIG. 19, the wireless communication apparatus includes a transceiver unit 21 and a processing unit 22.

For example, the transceiver unit 21 is configured to receive a first signal from a first terminal device in a first slot. The first signal includes at least one of the following: a symbol copied from a second slot, a to-be-received first transport block (TB), or a cyclic prefix extension (CPE). A frequency domain resource corresponding to the first slot is an unlicensed spectrum. The second slot is a next slot of the first slot.

The processing unit 22 is configured to determine, based on a first threshold, whether the first signal includes the to-be-received first TB, where the first threshold is configured by radio resource control (RRC), preconfigured, or protocol-specified.

Optionally, when N is less than the first threshold, the first signal does not include the to-be-received first TB. In other words, the transceiver unit 21 is configured to receive the symbol copied by the first terminal device.

Optionally, when N is greater than or equal to the first threshold, the first signal includes the to-be-received first TB. In other words, the transceiver unit 21 is configured to receive the first TB from the second terminal device on N first symbols in the first slot.

The transceiver unit 21 is further configured to receive a second TB from the first terminal device in the second slot, where the second TB is the same as the first TB.

The processing unit 22 is further configured to determine, based on a second threshold, whether a TB received in the second slot is the same as the first TB, where the second threshold is configured by radio resource control (RRC), preconfigured, or protocol-specified.

For example, when N is less than the second threshold, the transceiver unit 21 is configured to receive a second TB from the first terminal device in the second slot, where the second TB is the same as the first TB.

For example, when N is greater than or equal to the second threshold, the transceiver unit 21 is configured to receive a third TB from the first terminal device in the second slot, where the third TB is different from the first TB.

The transceiver unit 21 is further configured to receive a first AGC sequence on an AGC symbol in the second slot. The first AGC sequence is determined based on a value of L, L is a quantity of symbols copied from the second slot or a quantity of symbols used to send the to-be-sent first transport block TB, and L is a natural number less than or equal to N.

The transceiver unit 21 is further configured to receive one first AGC sequence on each of W interlaced resource blocks, where W is a positive integer.

It should be understood that a quantity of the interlaced resource blocks is the same as a quantity of sent AGC sequences.

It should be understood that a structure of the apparatus 20 shown in FIG. 19 is merely a possible form, and should not constitute any limitation on this embodiment of this application. This application does not exclude a possibility of a terminal device in another form that may appear in the future.

It should be understood that the wireless communication apparatus 20 according to this embodiment of this application may correspond to the receiving UE in the foregoing method embodiments. In addition, the foregoing and other management operations and/or functions of the units (or modules) in the wireless communication apparatus 20 are separately used to implement corresponding steps of the foregoing methods. Therefore, advantageous effects in the foregoing method embodiments can also be implemented.

It should be further understood that in this embodiment of this application, the processing unit (or module) may be implemented by a processor, and the transceiver unit (or module) may be implemented by a transceiver.

Figure 20:
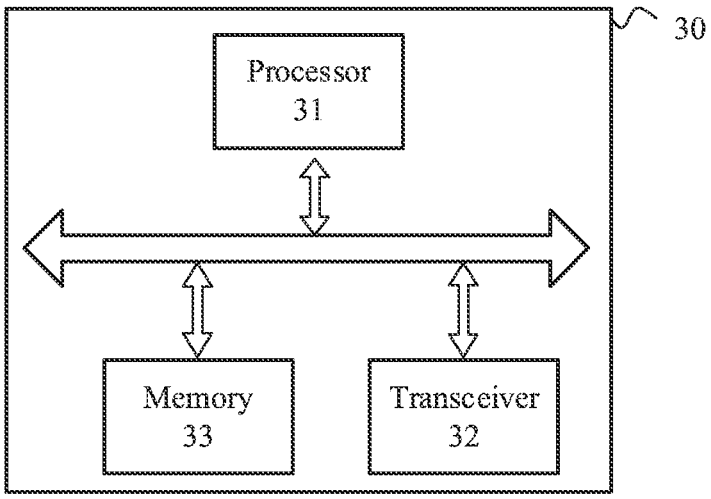
FIG. 20 is a schematic diagram of still another example of a wireless communication apparatus applicable to this application.

According to the foregoing method, FIG. 20 is a schematic diagram of a wireless communication apparatus 30 (for example, a first terminal device/transmitting UE) applicable to an embodiment of this application. As shown in FIG. 20, the wireless communication apparatus includes a processor 31, a transceiver 32, and a memory 33.

The processor 31, the transceiver 32, and the memory 33 communicate with each other through an internal connection path, to transfer a control signal and/or a data signal. In a possible design, the processor 31, the transceiver 32, and the memory 33 may be implemented by using a chip. The memory 33 may store program code, and the processor 31 invokes the program code stored in the memory 33, to implement corresponding functions of the terminal device.

For example, the processor 31 is configured to determine N first symbols in a first slot. N is a positive real number greater than 1 and less than M, M is a quantity of symbols included in the first slot, M is a positive integer, a frequency domain resource corresponding to the first slot is an unlicensed spectrum, and the first symbols are unoccupied symbols in the first slot.

The transceiver 32 is configured to send a first signal to a second terminal device on the N first symbols. The first signal includes at least one of the following: a symbol copied from a second slot, a to-be-sent first transport block (TB), or a cyclic prefix extension (CPE). The second slot is a next slot of the first slot.

It should be understood that the wireless communication apparatus 30 may correspond to the transmitting UE in the unlicensed spectrum channel access method 900, 1000, 1500, or 1700 according to embodiments of this application. The wireless communication apparatus 30 may include modules (or units) configured to perform the method performed by the first device in the channel occupying method 900, 1000, 1500, or 1700 in FIG. 9, FIG. 10, FIG. 15, or FIG. 17. In addition, the modules (or units) in the wireless communication apparatus 30 and the foregoing other operations and/or functions are separately used for implementing a corresponding procedure of the channel occupying method 900, 1000, 1500, or 1700 in FIG. 9, FIG. 10, FIG. 15, or FIG. 17.

Specifically, the transceiver 32 is configured to perform S920, S1020, or S1720 in the method 900, 1000, or 1700, and the processor 31 is configured to perform S910, S1010, S1510 and S1520, or S1710 in the method 900, 1000, 1500, or 1700. An execution process of specific steps is described in detail in the methods 900, 1000, 1500, and 1700. For brevity, details are not described herein again.

It may be understood that, although not shown, the wireless communication apparatus may further include another apparatus, such as an input apparatus, an output apparatus, or a battery.

Optionally, in some embodiments, the memory 33 may store some or all instructions used to perform the methods performed by the transmitting UE in the foregoing methods. The processor 31 may execute the instructions stored in the memory 33 and complete, together with another hardware (for example, the transceiver 32), the steps performed by the transmitting UE in the foregoing methods. For a specific working process and advantageous effects, refer to the descriptions in the foregoing method embodiments.

Figure 21:
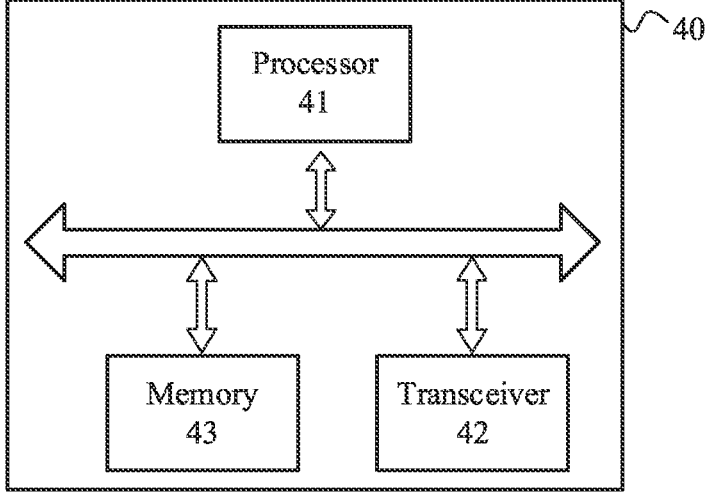
FIG. 21 is a schematic diagram of yet another example of a wireless communication apparatus applicable to this application.

According to the foregoing method, FIG. 21 is a schematic diagram of a wireless communication apparatus 40 (for example, a second terminal device/receiving UE) applicable to an embodiment of this application. As shown in FIG. 21, the wireless communication apparatus includes a processor 41, a transceiver 42, and a memory 43.

The processor 41, the transceiver 42, and the memory 43 communicate with each other through an internal connection path, to transfer a control signal and/or a data signal. In a possible design, the processor 41, the transceiver 42, and the memory 43 may be implemented by using a chip. The memory 43 may store program code, and the processor 41 invokes the program code stored in the memory 43, to implement corresponding functions of the terminal device.

For example, the transceiver 42 is configured to receive a first signal from a first terminal device in a first slot. The first signal includes at least one of the following: a symbol copied from a second slot, a to-be-received first transport block (TB), or a cyclic prefix extension (CPE). A frequency domain resource corresponding to the first slot is an unlicensed spectrum. The second slot is a next slot of the first slot.

The processor 41 is configured to determine, based on a first threshold, whether the first signal includes the to-be-received first TB, where the first threshold is configured by radio resource control (RRC), preconfigured, or protocol-specified.

It should be understood that the wireless communication apparatus 40 may correspond to the receiving UE in the unlicensed spectrum channel access method 900, 1000, 1500, or 1700 according to embodiments of this application. The wireless communication apparatus 40 may include modules (or units) configured to perform the method performed by the second device in the channel occupying method 900, 1000, 1500, or 1700 in FIG. 9, FIG. 10, FIG. 15, or FIG. 17. In addition, the modules (or units) in the wireless communication apparatus 40 and the foregoing other operations and/or functions are separately used for implementing a corresponding procedure of the channel occupying method 900, 1000, 1500, or 1700 in FIG. 9, FIG. 10, FIG. 15, or FIG. 17.

Specifically, the transceiver 42 is configured to perform S920, S1020, or S1720 in the method 900, 1000, or 1700, and the processor 31 is configured to perform S1510 and S1520 in the method 1500. An execution process of specific steps is described in detail in the methods 900, 1000, 1500, and 1700. For brevity, details are not described herein again.

It may be understood that, although not shown, the wireless communication apparatus may further include another apparatus, such as an input apparatus, an output apparatus, or a battery.

Optionally, in some embodiments, the memory 43 may store some or all instructions used to perform the methods performed by the receiving UE in the foregoing methods. The processor 41 may execute the instructions stored in the memory 43 and complete, together with another hardware (for example, the transceiver 42), the steps performed by the receiving UE in the foregoing methods. For a specific working process and advantageous effects, refer to the descriptions in the foregoing method embodiments.

It should be understood that, the processor in embodiments of this application may be a central processing unit (central processing unit, CPU), or may be another general purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It may be further understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. By way of example but not limitation, RAMs in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct ram-bus random access memory (direct rambus RAM, DR RAM).

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be noted that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

It should be further understood that "first", "second", "third", "fourth", and the like mentioned in this specification are merely intended to describe the technical solutions of this application more clearly, and should not constitute any limitation on this application.

It should be noted that aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (compact disc, CD) and a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may represent one or more devices and/or other machine-readable media that are configured to store information. The term "machine readable media" may include but is not limited to a radio channel, and various other media that can store, contain and/or carry an instruction and/or data.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate by using a local and/or remote process and based on a signal having, for example, one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual needs to achieve the objectives of the technical solutions of embodiments of this application.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   determining N first symbols in a first slot, wherein N is a positive real number greater than 1 and less than M, M is a quantity of symbols included in the first slot, M is a positive integer, a frequency domain resource corresponding to the first slot is an unlicensed spectrum, and the first symbols are unoccupied symbols in the first slot;
   sending, to a terminal device, a first signal on the N first symbols, wherein the first signal comprises at least one of the following: one or more symbols copied from a second slot that is a next slot of the first slot, a first transport block (TB), or a cyclic prefix extension (CPE);
   generating a first automatic gain control (AGC) sequence based on a value of L, L is a quantity of the one or more symbols copied from the second slot or a quantity of symbols used to send the first TB, and L is a natural number less than or equal to N; and
   sending the AGC sequence on an AGC symbol in the second slot.

2. The method of claim 1, the method further comprising:
   determining, based on a first threshold, whether the first TB is to be sent in the first slot, wherein the first threshold is configured by radio resource control (RRC), the first threshold is preconfigured, or the first threshold is protocol-specified.

3. The method of claim 1, wherein the one or more symbols copied from the second slot comprise one or more symbols other than an automatic gain control (AGC) symbol in the second slot.

4. The method of claim 1, wherein the N first symbols comprise a gap symbol extended with a cyclic prefix (CP) of an automatic gain control (AGC) symbol in the second slot onto the gap symbol.

5. The method of claim 1, wherein the first signal comprises the first TB, and the method further comprises:
   sending a second TB to the terminal device in the second slot, wherein the second TB is the same as the first TB.

6. The method of claim 1, the method further comprising:
   determining, based on a second threshold and a value of N, whether a TB to be sent in the second slot is the same as the first TB, wherein the second threshold is configured by radio resource control (RRC), or the second threshold is preconfigured, or the second threshold is protocol-specified; and
   if N is less than the second threshold, sending a second TB to the terminal device in the second slot, wherein the second TB is the same as the first TB; or
   if N is greater than or equal to the second threshold, sending a third TB to the terminal device in the second slot, wherein the third TB is different from the first TB.

7. The method of claim 1, wherein the sending the first AGC sequence comprises:
   sending W first AGC sequences on W interlaced resource blocks such that one first AGC sequence is sent on each of the W interlaced resource blocks, wherein W is a positive integer.

8. A wireless communication method, comprising:
   receiving a first signal from a first terminal device in a first slot, wherein the first signal comprises at least one of the following: one or more symbols copied from a second slot that is a next slot of the first slot, a first transport block (TB), or a cyclic prefix extension (CPE), a frequency domain resource corresponding to the first slot is an unlicensed spectrum; and
   receiving a first automatic gain control (AGC) sequence on an AGC symbol in the second slot, wherein the first AGC sequence indicates a value of L, L is a quantity of symbols copied from the second slot or a quantity of symbols used to send the first TB, and L is a natural number less than or equal to N.

9. The method of claim 8, the method further comprising:
   determining, based on a first threshold, whether the first signal comprises the first TB, wherein the first threshold is configured by radio resource control (RRC), the first threshold is preconfigured, or the first threshold is protocol-specified.

10. The method of claim 8, wherein the first signal comprises the first TB and the method further comprises:
   receiving a second TB from the first terminal device in the second slot, wherein the second TB is the same as the first TB.

11. The method of claim 8, the method further comprising:
   determining, based on a second threshold, whether a TB received in the second slot is the same as the first TB, wherein the second threshold is configured by radio resource control (RRC), the second threshold is preconfigured, or the second threshold is protocol-specified.

12. The method of claim 8, wherein the receiving the first AGC sequence comprises:

receiving one first AGC sequence on each of W interlaced resource blocks, wherein W is a positive integer.

13. The method of claim 8, wherein the N first symbols in the first slot comprise a gap symbol with a cyclic prefix (CP) of an automatic gain control (AGC) symbol in the second slot.

14. The method of claim 8, the method further comprising:

combining the one or more symbols that are in the first slot and copied from the second slot and second one or more symbols that are in the second slot, wherein the one or more symbols in the first slot are a copy of the second one or more symbols in the second slot.

15. An apparatus comprising:

a processor; and a non-transitory memory storing program instructions that, when executed by the processor, cause the apparatus to perform the operations:

determining N first symbols in a first slot, wherein N is a positive real number greater than 1 and less than M, M is a quantity of symbols included in the first slot, M is a positive integer, a frequency domain resource corresponding to the first slot is an unlicensed spectrum, and the first symbols are unoccupied symbols in the first slot;

sending, to a terminal device, a first signal on the N first symbols, wherein the first signal comprises at least one of the following: one or more symbols copied from a second slot that is a next slot of the first slot, a first transport block (TB), or a cyclic prefix extension (CPE);

generating a first automatic gain control (AGC) sequence based on a value of L, L is a quantity of the one or more symbols copied from the second slot or a quantity of symbols used to send the first TB, and L is a natural number less than or equal to N; and sending the AGC sequence on an AGC symbol in the second slot.

16. The apparatus of claim 15, wherein the N first symbols in the first slot comprise a gap symbol extended with a cyclic prefix (CP) of an automatic gain control (AGC) symbol in the second slot.

17. The apparatus of claim 15, wherein the first signal comprises the first TB, and the program instructions, when executed by the processor, further cause the apparatus to perform the operations:

determining, based on a threshold and a value of N, whether a TB to be sent in the second slot is the same as the first TB; and if N is less than the second threshold, sending a second TB to the terminal device in the second slot, wherein the second TB is the same as the first TB; or if N is greater than or equal to the second threshold, sending a third TB to the terminal device in the second slot, wherein the third TB is different from the first TB.

* * * * *